(12) United States Patent
Fischer

(10) Patent No.: US 10,480,460 B2
(45) Date of Patent: Nov. 19, 2019

(54) EGR SYSTEM WITH PARTICLE FILTER FOR A GASOLINE ENGINE

(71) Applicant: TENNECO GMBH, Edenkoben (DE)

(72) Inventor: Michael Fischer, Mainz (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 15/621,033

(22) Filed: Jun. 13, 2017

(65) Prior Publication Data

US 2017/0276096 A1 Sep. 28, 2017

Related U.S. Application Data

(63) Continuation of application No. PCT/EP2015/080322, filed on Dec. 17, 2015, which
(Continued)

(30) Foreign Application Priority Data

Dec. 17, 2014 (DE) .......... 10 2014 118 813
May 26, 2015 (DE) .......... 10 2015 108 224

(51) Int. Cl.
*F02M 26/35* (2016.01)
*F02M 26/44* (2016.01)
(Continued)

(52) U.S. Cl.
CPC .......... *F02M 26/35* (2016.02); *F02B 37/18* (2013.01); *F02M 26/05* (2016.02); *F02M 26/07* (2016.02);
(Continued)

(58) Field of Classification Search
CPC ........ F02M 26/35; F02M 26/04; F02M 26/05; F02M 26/06; F02M 26/07; F02M 26/15;
(Continued)

(56) References Cited

U.S. PATENT DOCUMENTS 4,356,806 A 11/1982 Freesh
5,239,960 A 8/1993 Sasaki et al.
(Continued)

FOREIGN PATENT DOCUMENTS

DE 697 37 838 T2 2/2008
DE 10 2010 046 900 A1 4/2011
(Continued)

OTHER PUBLICATIONS

English translation of IPRP—Form PCT/IB/373 for PCT/EP2015/060322.
(Continued)

*Primary Examiner* — Thai Ba Trieu
(74) *Attorney, Agent, or Firm* — Hudak, Shunk & Farine Co. LPA

(57) ABSTRACT

An exhaust gas recirculation system for a gasoline engine, including an exhaust gas line, which can be connected to an exhaust manifold of the gasoline engine and which includes a turbine, and an inlet line, which can be connected to an intake manifold of the gasoline engine and which includes a compressor. A main exhaust gas catalytic converter is provided in the exhaust gas line, and at least one exhaust gas recirculation line_I is provided which branches off from the exhaust gas line upstream of the turbine and opens into the inlet line downstream of the compressor. At least one particle filter_I is provided which is placed in the exhaust gas recirculation line_I or in the exhaust gas line upstream of the exhaust gas recirculation line_I. The particle filter_I has a 3/Ox coating, and at least one cooler_I is provided within the exhaust gas recirculation line_I downstream of the at least one particle filter.

29 Claims, 11 Drawing Sheets

Related U.S. Application Data is a continuation-in-part of application No. 14/721,256, filed on May 26, 2015.

(51) Int. Cl.

| | | |
|---|---|---|
| *F02M 26/05* | (2016.01) | |
| *F02M 26/07* | (2016.01) | |
| *F02M 26/15* | (2016.01) | |
| *F02M 26/17* | (2016.01) | |
| *F02M 26/23* | (2016.01) | |
| *F02B 37/18* | (2006.01) | |
| *F02M 26/16* | (2016.01) | |

(52) U.S. Cl.
CPC ............ *F02M 26/15* (2016.02); *F02M 26/16* (2016.02); *F02M 26/23* (2016.02); *F02M 26/44* (2016.02)

(58) Field of Classification Search
CPC ........ F02M 26/16; F02M 26/23; F02M 26/43; F02M 26/44; F01N 3/2066; F02B 37/18; F02B 38/173; Y02T 10/144
USPC ......... 60/605.2, 612, 286; 701/108; 123/562
See application file for complete search history.

(56) References Cited

U.S. PATENT DOCUMENTS

| | | |
|---|---|---|
| 5,671,600 A | 9/1997 | Pischinger et al. |
| 7,426,922 B2 * | 9/2008 | Shimo .................. F02D 41/005 123/568.12 |
| 7,461,641 B1 | 12/2008 | Styles et al. |
| 2011/0072794 A1 | 3/2011 | Van Nieuwstadt et al. |
| 2011/0219750 A1 | 9/2011 | Sakurai et al. |
| 2011/0271661 A1 | 11/2011 | Knafl et al. |
| 2013/0167513 A1* | 7/2013 | Cattani .................. F01N 3/0222 60/286 |
| 2014/0020361 A1 | 1/2014 | Warey et al. |
| 2014/0165560 A1 | 6/2014 | Henry et al. |

FOREIGN PATENT DOCUMENTS

| | | |
|---|---|---|
| DE | 10 2010 045 503 A1 | 3/2012 |
| DE | 10 2010 041 982 A1 | 4/2012 |
| DE | 10 2011 015 629 A1 | 4/2012 |
| DE | 10 2012 107 649 A1 | 2/2014 |
| EP | 2116703 A1 | 11/2009 |
| EP | 2 194 351 B1 | 5/2012 |
| EP | 2 592 247 A1 | 5/2013 |
| EP | 2 808 518 A1 | 12/2014 |
| GB | 2484495 A | 4/2012 |
| WO | 2013175091 A1 | 11/2013 |

OTHER PUBLICATIONS

Hoffmeyer, H., et al, CARE—Catalytic Reformated Exhaust Gases in Turbocharged DISI-Engines, SAE Int. J. Fuels Lubr., 2009, pp. 139-148, vol. 2, Issue 1.

* cited by examiner

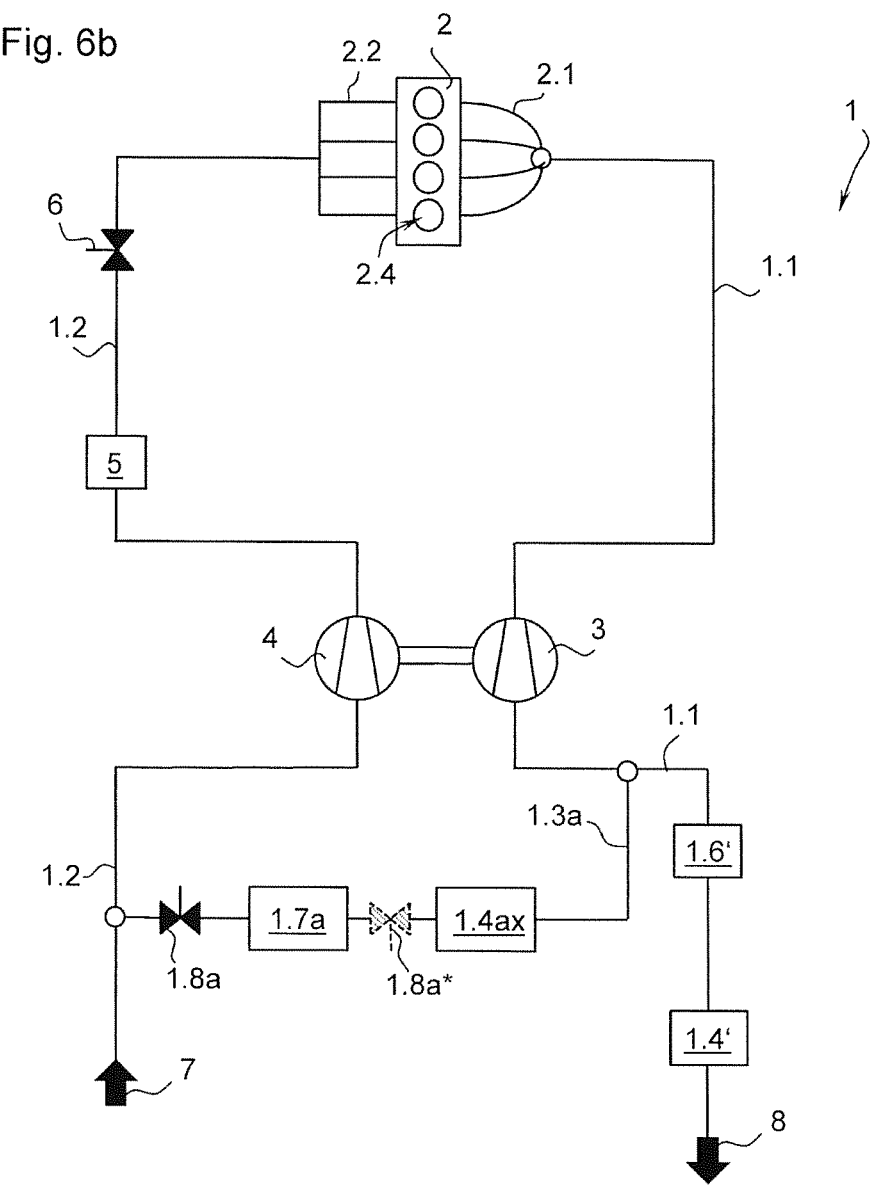

EGR SYSTEM WITH PARTICLE FILTER FOR A GASOLINE ENGINE

FIELD OF THE INVENTION

The invention relates to an exhaust gas recirculation system (EGR system) for a gasoline engine, with an exhaust gas pipe connectable to an exhaust manifold, with an inlet pipe connectable to an inlet manifold, wherein optionally an exhaust gas turbocharger (EGT) is provided, such that a turbine is placed in the exhaust pipe and at least one compressor is arranged in the inlet pipe, wherein, in the event of an EGT being provided, at least one exhaust gas recirculation pipe_I is provided, which upstream of the turbine branches off at the exhaust pipe, and downstream of the compressor opens into the inlet pipe, is conjointly configured as a high-pressure EGR pipe, and/or at least one exhaust gas recirculation pipe_II is provided, which downstream of the turbine branches off at the exhaust pipe, and upstream of the compressor opens into the inlet pipe, conjointly configured as a low-pressure EGR pipe, wherein a main exhaust gas catalytic converter is provided in the exhaust pipe.

BACKGROUND OF THE INVENTION

The invention also relates to an EGR system of the type referred to heretofore with the exhaust gas recirculation pipe_II, wherein no EGT is provided. In this case, a pure naturally aspirated or suction engine is involved. The connection of an exhaust gas recirculation pipe_II therefore corresponds, in the absence of an EGT, to the architecture of a low-pressure exhaust gas recirculation pipe, which branches off downstream of the compressor.

Gasoline engines include all non-diesel engines, concomitantly all external ignition engines, SI (spark ignited) engines with spark plugs, as well as, at least in certain sectors, also some self-igniting engines, and CAI (Controlled Auto Ignition) engines, which are operated with gasoline fuels such as petrol, alcohol, or gas. Diesel engines, by contrast, are self-ignition engines, HCCI (Homogeneous Charge Compression Ignition) engines, which are operated with diesel or oils or other fuels.

From U.S. Pat. No. 5,671,600 A an exhaust gas recirculation system for diesel engines is known. Provided at the exhaust gas outlet or at the exhaust pipe is a particle filter, to which an exhaust gas recirculation pipe is connected. The exhaust gas recirculation pipe opens upstream of a charge-air compressor into the inlet pipe. Provided inside the exhaust gas recirculation pipe is a valve for changing the exhaust gas mass flow. The particle filter serves to protect the charge-air compressor or the charge-air cooler against dirt contamination.

DE 10 2011 015 629 A1 describes the placement of a three-way catalytic converter inside an exhaust gas recirculation pipe of a gasoline engine in order to improve the pollutant emission, and concomitantly a reduction of HC, NOx and CO.

From EP 2 194 351 B1 a charge-air cooler with integrated diesel particle filter to protect the charge-air compressor is known.

DE 10 2012 107 649 B4 describes a particle filter in the exhaust pipe upstream of an exhaust gas recirculation pipe for supplying a pressure wave charger, which to the knowledge of the Applicants is used for diesel engines.

US 2014/0165560 A1 describes, according to FIG. 1, an exhaust gas recirculation pipe of a diesel engine, into which a particle filter and an AMOX catalytic converter is integrated. According to Paragraph [0025], this exemplary embodiment is also intended to be used for a gasoline engine. Due to there being no need for ammonia as a reduction agent for the reduction of NOx with a constantly stoichiometric or rich-running gasoline engine, the use of an AMOX catalytic converter in the exhaust gas recirculation pipe comes into consideration for the oxidation of surplus ammonia, concomitantly the embodiment according to FIG. 1, but not for a gasoline engine.

U.S. Pat. No. 4,356,806 A describes an exhaust gas recirculation pipe for a gasoline engine with an air cooler and two downstream filters for coarse dirt.

DE 10 2010 046 900 A1 describes two variants of an exhaust gas recirculation pipe for a gasoline engine, wherein, in the main exhaust pipe upstream of the turbine, a catalytic converter and a downstream particle filter are provided. An exhaust gas recirculation pipe_I branches off upstream of the turbine and opens downstream of the compressor. Only one cooler is placed inside this exhaust gas recirculation pipe_I. An exhaust gas recirculation pipe_II branches off downstream of the particle filters and opens upstream of the compressor. Likewise, only one cooler is placed inside this exhaust gas recirculation pipe_II.

GB 2 484 495 A describes an exhaust gas recirculation pipe for a gasoline engine, contained in which are a catalytic converter, downstream a cooler, and further downstream an oxidation catalytic converter. The oxidation catalytic converter serves to carry out the oxidation of additional hydrocarbons introduced upstream for the purpose of combustion of particles.

SUMMARY OF THE INVENTION

The invention is based on the object of configuring and arranging an EGR system for gasoline engine of such a nature that a lower degree of contamination of components in the suction system and improved combustion are achieved, which thereby allow for increased operational reliability and, together with reduced pollutant emissions, make possible the improved efficiency of the engine.

An external EGR system, such as is claimed hereinafter, consists as a rule of at least one exhaust gas recirculation pipe (EGR pipe), an exhaust gas recirculation cooler (EGR cooler), and an exhaust gas recirculation flap valve (EGR valve). This is to be distinguished from an internal EGR, which is realized by overlap of control times.

An exhaust gas catalytic converter for a gasoline engine has as a rule a three-way coating. A three-way coating is a catalytically effective coating which causes a conversion of CO, HC and/or NOx. CO and HC are oxidized to CO2 and H2O, while NOx is reduced to N2 and O2. This three-way coating differs in a determinant manner from a pure oxidation coating, since with a pure oxidation coating no reduction of NOx is effected catalytically.

With regard to oxidation coatings, again, a distinction is to be made at least between oxidation coatings for the oxidation of NOx and oxidation coatings for the oxidation of HC and, as appropriate, CO, referred to hereinafter as HC-Oxi-coating.

Within the framework of this invention, the three-way coating and the HC-Oxi-coatings are grouped together under the designation 3/Ox-coating.

A particle filter is specified in particular in that particles which are larger than 25-15 nm, and in particular larger than 10 nm, are retained. Ideally, the size of the retained particles could be even smaller. Particle filters of the type referred to heretofore are also designated as fine dust particle filters.

The object is solved according to the invention in that at least one particle filter_I is provided, which is placed in the exhaust gas recirculation pipe_I or in the exhaust pipe upstream of the exhaust gas recirculation pipe_I, wherein the particle filter_I has a 3/Ox-coating, and/or that at least one particle filter_II is provided, which is placed in the exhaust gas recirculation pipe_II or in the exhaust pipe upstream of the exhaust gas recirculation pipe_II, wherein the exhaust gas recirculation pipe_II branches off upstream or downstream of the exhaust gas catalytic converter, wherein, with branching off upstream of the exhaust gas catalytic converter, the particle filter_II exhibits a 3/Ox-coating, or, with branching off downstream of the exhaust gas catalytic converter, an additional particle filter is placed in the exhaust gas return pipe_II, and that, downstream of the at least one particle filter_I or particle filter_II respectively, at least one cooler is provided inside the exhaust gas return line or exhaust gas recirculation pipe_II respectively. The solution also comprises the combination of an HP-EGR with a particle filter and a LP-EGR with a particle filter. Also to be regarded as a solution is a quasi-LP-EGR without EGT, with which the inlet pipe is not configured with a compressor and the exhaust pipe does not have a turbine.

The exhaust gas recirculation pipe_I is a high-pressure EGR pipe, which is used in particular in the full-load range. The quantity of recycled exhaust gas can be increased independently of the condensing water contained in it, since any damage to the compressor is excluded. The exhaust gas recirculation pipe_II is a low-pressure EGR pipe, which is used in particular at low revolution speeds. The quantity of exhaust gas which can be recirculated by the low-pressure EGR pipe is restricted against the background of the volume flow of condensing water, which must be conveyed via the compressor.

In the EGR system and the suction system of gasoline engines, deposits are to be observed, which are designated as "wet soot" or "fouling", which have serious effects such as reduced cooling capacity, blockage, defective sensors or actuators, poor distribution, and irregular combustion in the cylinder. For these reasons, and because low suction temperatures at high load operation of gasoline engines are of advantage, EGR systems have hitherto only rarely been used with gasoline engines, and with restrictions. The situation is different with diesel engines. Diesel particles are drier constituents, which in contrast to "wet soot" exhibit a lesser inclination to condensation and clogging. diesel engines can also be operated at higher EGR temperatures, wherein minor consumption disadvantages are offset against a perceptible NOx reduction.

With EGR systems for gasoline engines, a cooling of the recirculated exhaust gas for the optimization of the combustion is advantageous, since the recirculation of non-cooled exhaust gases, in particular at higher loads and at full load, leads to higher suction temperatures due to the hot exhaust gases being introduced. This in turn results in filling losses and an increase in the knocking tendency of the gasoline engine. This incurs undesirable performance losses of the engine and high exhaust gas temperatures. In contrast to the dry constituents conveyed in the diesel exhaust gas, the particles conveyed in the gasoline engine exhaust gas are wet constituents ("wet soot"), which exhibit a very high condensation and clogging tendency.

The cooling accordingly has the consequence of incurring an increased quantity of condensates, consisting of water and/or hydrocarbons or hydrocarbon compounds and incompletely combusted combustion residues, in the recirculated exhaust gas, which leads to an increased degree of sooting in the form of "wet soot", concomitantly wet, clogging, or adhesive deposits in the EGR system and in the air intake suction system. Cooling of the recirculated exhaust gas is therefore disadvantageous, especially given that, with stoichiometrically operated gasoline engines, the water content in the recirculated exhaust gas is higher than with the diesel engine, and therefore the quantity of precipitating condensate is substantially greater. A combination of the particle filter with a cooler, such as the charge-air cooler, as is described in EP 2 194 351 B1 for a diesel particle filter, therefore does not come into consideration for gasoline engines. Due to the immediate or simultaneous cooling of the exhaust gases in the particle filter, an independent regeneration of the filter, and the high exhaust gas temperatures required for this, are prevented. This can lead to the clogging of the filter.

In addition to the dirt contamination and risk of clogging described heretofore, there is the difficulty that the conditions required for the self regeneration of the particle filter, in particular an air excess in the particle filter, can only prevail in a clearly restricted operational range. In this case, additional active regeneration measures are required, which are disadvantageous with regard to operation and costs. In contrast to this, active regeneration measures for the particle filter in a diesel engine are normal and essential, since in very broad engine operational ranges the prevailing exhaust gas temperatures are low, and active regeneration measures are necessary.

A combined use of a particle filter for fine dust with a cooler inside an EGR system or an EGR pipe therefore could not simply be considered for gasoline engines in actual practice.

Particle filters for gasoline engines, like diesel particle filters, retain particles, referred to as fine dust. For the regeneration of the particle filter, i.e. for the burning off of filtered particles, sufficiently high exhaust gas temperatures and oxygen surplus are required. After a warming-up phase, these preconditions are, as a rule, present at the temperature in EGR systems of gasoline engines. In wide operational ranges of the gasoline engine, i.e. in the fired state (Lambda=1 with stoichiometrically operated gasoline engines), however, an oxygen surplus is missing as a basis for a combustion of the particles in the particle filter. Accordingly, only particles are conducted by the exhaust gas flow to the particle filter which are then burned there in part with the residual oxygen available, and the other part is retained there until sufficiently good burn-off conditions are available for the complete burn. A regeneration, concomitantly a combustion of the particles, can only take place in such operational states of the engine in which sufficient oxygen is available in the exhaust gas for the combustion of the particles in the GPF (Gasoline Particle Filter), for example in thrust phases of the engine, if the injection is switched off. In this thrust phase, i.e. with the engine continuing to turn over and inlet valve and outlet valve actuation, oxygen passes, with the EGR valve opened, into the EGR system and flows through the particle filter integrated there. When an adequate temperature pertains in the particle filter, the particles are then burned to $CO_2$. Under certain circumstances, CO, HC and NOx also occur.

Irrespective of the purification step of the particle filter referred to, and the difficulties incurred with this, it has been determined that it is only with increasing and consistent cooling of the exhaust gas close to the level of the fresh air suctioned in and, as appropriate, compressed and re-cooled, that the advantages referred to of the use of recirculated exhaust gas with the gasoline engine come into significant effect. Such cooling, however, also requires a corresponding sustained cooling capacity of the cooler, but, in view of the dirt contamination described, this was not achievable.

However, if a particle filter for fine dust is used in the EGR pipe, this does not lead to the protection of the suction air system against sooting due to the particles and other substances carried in the exhaust gas, but it does guarantee, in particular, the wide-reaching and sustained use of an exhaust gas cooler inside the EGR pipe. A separate cooling of the recirculated exhaust gas allows for a reduction in the cooling capacity in the suction pipe, and still lower temperatures in the suction pipe. This leads in the final analysis to a sustained avoidance of filling losses, a sustained reduction of the knock tendency, and sustained avoidance of the performance losses inherent with this.

With the use of a particle filter, however, inevitably dirt contamination with "wet soot" is inherent. This dirt contamination is countered according to the invention by the use of the upstream 3-way catalytic converter or an HC-oxidation catalytic converter. The catalytic converter can be integrated inside the particle filter as a coating, or provided as a separate catalytic converter, which is placed upstream in the exhaust gas recirculation pipe or inside the exhaust pipe upstream of the branching of the exhaust gas recirculation pipe. With the catalytic converter, hydrocarbons, referred to as HCs, are oxidized, such that the "wet soot" loses its adherence and sticking properties. This therefore allows both for better regeneration of the particle filter, as well as uniform charging.

The nitrogen oxides contained in the exhaust gas also give rise to a lower pH value of the water conducted in the exhaust gas and condensing in the cooler. This inherently incurs increased corrosion of the cooler, as well as of other downstream components of the EGR line and of the fresh air system. By the use of the 3-way coating, in addition to the oxidation of the HC's, the NOx in particular is reduced. As a result, the pH value of the condensing water can be raised with sustained effect to a neutral or slightly alkaline value, such that this massive corrosion can be counteracted in a simple manner. In addition, due to the reduction of the NOx in the recirculated exhaust gas, the knocking tendency of the engine is also improved.

The combination of the 3-way or oxidation catalytic converter with an integrated or downstream particle filter inside the EGR line, as well as of a downstream cooler, leads not only to a reduced dirt contamination of the EGR components and of the downstream components of the fresh air line, but also to the usability of a cooler and to the regeneration capacity of the particle filter, and therefore to inspection intervals which are readily usable in practice. In addition to this, with the use of the 3-way coating, the requirements for the corrosion resistance of the components referred to can be reduced. In particular, in all cases, the knock resistance can be improved. This is a precondition for an increase in the volume flow of recirculated exhaust gas (EGR rate) on the one hand, as well as, on the other, for an adjustment of the ignition angle to early.

In the framework of the testing of the exhaust gas recirculation system according to the invention, it was also determined that, in running operation of the gasoline engine, with adequate and consistent cooling guaranteed and simultaneous reduction of the NOx, the EGR rate can be increasingly raised above the value attained hitherto. A better knock behaviour was also achieved, which allows for the ignition angle to be adjusted to early. This ensures a substantially more stable combustion. Against this background, a higher compression ratio could also be used. The degree of efficiency of the engine is therefore substantially increased, and therefore not only is the fuel consumption correspondingly reduced, but also the combustion temperature lowered.

The external EGR system according to the invention with the gasoline engine ensures a reduction of the particles in the recirculated exhaust gas, inherent to which is the possibility of a more substantial cooling of the recirculated exhaust gas, in particular with higher engine load and higher engine revolutions, and therefore also a reduced fuel consumption.

Conversely, an EGR-System is used for a diesel engine, in order in particular to reduce the NOx emission in wide part-load ranges and at low engine revolution speeds. With the use of an EGR system, however, due to the combustion process with the diesel engine, there will necessarily be an increase in the soot particle emission, as well as increased fuel consumption. This disadvantage is countered in the case of the gasoline engines, however.

It is therefore self-evident that the advantages and disadvantages known with respect to the diesel engine, and the function modes to be taken into account with the use of an EGR system, cannot be transferred to the gasoline engine.

Due to purified recirculated exhaust gas, a reduced dirt contamination of components in the exhaust gas recirculation and suction system and improved cooling and improved combustion are achieved, which, as well as increased operational reliability and reduced pollution emissions, at the same time allow for improved efficiency of the gasoline engine.

Due to the 3-way catalytic converter or the oxidation catalytic converter, the advantages referred to heretofore of reduced quantities of HC and NOx are achieved. It is possible, additionally or alternatively, for an uncoated particle filter to be placed separately before upstream or preferably downstream of the catalytic converter in the exhaust gas recirculation pipe. This allows for an additional pressure rise in the exhaust pipe, and therefore a higher fuel consumption of the gasoline engine to be avoided.

In the event of the recirculated exhaust gas being drawn off upstream of the catalytic converter of the exhaust gas system, an additional 3-way catalytic converter can be integrated in the exhaust gas recirculation pipe. These catalytic converters, however, represent a further structural component, which can, as an alternative, be avoided with a particle filter with a 3/Ox coating.

In any event, the oxidation of pollution components leads to heat development and therefore to the heating of the downstream particle filters. This extends the use of the independent regeneration of the particle filters in thrust operation to further operational states of the engine.

The 3/Ox-coating of the particle filters takes effect with engine operation under ignition. The same applies to the filter effect of the particle filter. The regeneration of the particle filter takes place in thrust operation. A catalytic reduction is not possible due to the air surplus, and with the absence of fuel delivery is not absolutely necessary in the thrust phase. Due to the combination of particle filtering and catalytic conversion of further incomplete combustion products, the exhaust gas which is recirculated to the engine exhibits a high degree of purity, both with regard to the combustion products as well as with regard to the particles. This has a positive effect on the formation of deposits in the suction system, the cooling, and on the combustion and pollutant emission of the gasoline engine.

The particle filter accordingly retains soot and other combustion residues in the EGR stretch. Due to the 3/Ox-coating, substances (HC, NOx, CO) which on cooling would lead to fouling formation (wet soot) are converted in the hot state to non-harmful substances (CO2, H20, N2), as a result of which additional inert gas is produced, which is conducted back to the engine.

The reduction of the NOx leads to a minor risk of corrosion, but above all does favour the knocking tendency of the engine and an earlier ignition time, as a result of which the focal point is further optimized and the exhaust gas temperature perceptibly reduced.

The optimum purification of the exhaust gas allows for the use of a cascaded cooling of the recycled and introduced gases and of the charging mass. Accordingly, the condensate formation in the suction system of the engine can be guided in such a way that its occurrence allows for additional advantages. This is the case in particular in the suction tract of the engine. Water which precipitates out in a cooler located here is heated downstream in the suction tract and again evaporated. This leads to a further reduction in the temperature of the charge mass suctioned into the cylinder. This has an advantageous effect on the possible filling of the engine, and allows for lower charging pressures.

An HP-EGR ensures higher exhaust gas temperatures, which have an overall positive effect on the particle filter regeneration and on pollutant reduction. The opening downstream of the compressor has the advantage that the regulating stretch is shorter. This combination of branching off upstream of the turbine and opening downstream of the compressor is designated as high-pressure EGR (HP-EGR). However, it is possible that an adequately high pressure gradient will not be available in all desired operational states between the exhaust gas system and the suction system for the conducting of the desired recycled exhaust gas quantity. In the event of an additional cooling being required of the recycled exhaust gas, the purified exhaust gas can also be conducted to the suction system downstream of the compressor and upstream of the charge-air cooler. Accordingly, the exhaust gas is cooled not only in the EGR cooler, but additionally also in the charge-air cooler. An arrangement is also conceivable in which the charge-air cooler is configured so effectively that no EGR cooler is required for the recirculated exhaust gas in the EGR pipe.

The branching upstream of the turbine in combination with opening upstream of the compressor is designated as the maximum pressure-EGR (MP-EGR), and ensures a substantial pressure difference inside the EGR pipe even for larger exhaust gas recirculation quantities required. However, this does cause the regulating stretch to be longer than with the HP-EGR, and the compressor and the turbine must, if necessary, be adjusted to the changed mass throughput values.

The branching off downstream of the turbine in combination with the opening upstream of the compressor is designated as low-pressure-EGR (LP-EGR). This arrangement has the advantage that exhaust gas can also be conducted back into the suction system in such operational states in which the pressure gradients are not sufficient for an HP-EGR. Moreover, LP-EGR is characterized by a lower exhaust gas temperature, since the exhaust gas is drawn off downstream of the turbine, as a result of which the cooling capacity required for the EGR cooler can be reduced. As well as that, the compressor in the suction stretch must be adjusted to the greater mass throughput.

It can be advantageous in this respect if the particle filter_I, which is located in the exhaust gas recirculation pipe, is free of a 3/Ox-coating, and if an additional exhaust gas catalytic converter is located upstream of the particle filter inside the exhaust gas recirculation pipe_I and/or the particle filter_II, which is located downstream of the exhaust gas catalytic converter in the exhaust gas recirculation pipe_II, exhibits a 3/Ox-coating or is free of a 3/Ox-coating. The additional exhaust gas catalytic converter takes over the function of the 3/Ox-coating. However, further pressure losses are associated with the additional exhaust gas catalytic converter. With the branching off of the exhaust gas recirculation pipe_II downstream of the exhaust gas catalytic converter, the at least one particle filter can nevertheless exhibit a 3/Ox-coating. This supplements the performance of the main exhaust gas catalytic converter, since as many HC and NOx compounds as possible are converted in the EGR pipe.

It can additionally be advantageous if the cooler_I, _II inside the EGR pipe_I, _II and/or the charge-air cooler is configured as exhaust gas engine cooling water or as exhaust gas low-temperature cooling water cooler, and is at least thermally separated from the particle filter. This allows for the necessary cooling capacity for the respective EGR pipe to be attained. In special embodiments, a plurality of coolers, which can also be configured as switchable, can be arranged in the exhaust gas recirculation pipe in series or also in parallel. The cooler is spatially separated, or at least thermally separated, from the particle filter, in order for the particle filter to exhibit high temperatures in wide engine operational states, so that, with an oxygen surplus in the exhaust gas, the filtered constituents are regenerated by oxidation. In this way the greatest possible working range of the particle filter is attained for the regeneration. Unlike an exhaust gas engine cooling water cooler, an exhaust gas low-temperature cooling water cooler is a cooler with a separate cooling circuit, concomitantly separated from the engine cooling water. The cooling temperature which it can reach is lower than that of the engine cooling water cooler.

The exhaust gas recirculation pipe_II only provides a technical effect which diverges from the exhaust gas recirculation pipe_I if a turbine is provided in the exhaust pipe. For this purpose, the exhaust gas recirculation pipe_II is branched off downstream of the turbine, while the first EGR pipe branches off upstream of the turbine, such that, with the first pipe or respectively the exhaust gas recirculation pipe_II, as a supplement or an alternative, different exhaust gas recirculation architectures from those defined hereinafter are possible, such as a high-pressure EGR (HP-EGR) or a low-pressure EGR (LP-EGR).

With the exhaust gas recirculation pipe_II present, at least one particle filter can be located in the exhaust pipe between the exhaust gas recirculation pipe_I and the exhaust gas recirculation pipe_II.

The exhaust gas recirculation pipe_I can also connect to the exhaust manifold and/or open at the intake manifold. Typically, if a compressor is present, the exhaust gas recirculation pipe_II opens upstream of the compressor.

According to the invention, the following combinations of features come into consideration, namely x) at least one first EGR pipe, which branches off from the exhaust pipe and opens in the inlet pipe, wherein a particle filter is arranged in the EGR pipe or in the exhaust pipe upstream of the EGR pipe; y) a turbine is provided in the exhaust pipe; z) a second EGR pipe is provided, which branches at the exhaust pipe and opens in the inlet pipe, wherein at least one particle filter is provided, which is located in the second EGR pipe and/or which is located in the exhaust pipe upstream of the second EGR pipe; i) a 3/Ox-coating of the particle filter or a 3-way catalytic converter upstream of the particle filter; j) a cooler inside the EGR pipe downstream of the particle filter, wherein the features i)+j)+x) or one of the feature combinations. i)+j)+x)+y) or i)+j)+y)+z) or i)+j)+x)+y)+z) are to be applied. The feature group i)+j)+z), in the absence of a turbine, corresponds to the feature group i)+j)+x).

Claimed is an exhaust gas recirculation system for a gasoline engine with an exhaust pipe which can be connected to an exhaust manifold of the gasoline engine, with a turbine and with an inlet pipe with a compressor which can be attached to an inlet manifold of the gasoline engine, wherein a main exhaust gas catalytic converter is provided in the exhaust pipe, wherein a1) at least one exhaust gas recirculation pipe_I is provided, which branches from the exhaust pipe upstream of the turbine and opens into the inlet pipe downstream of the compressor, and/or b1) at least one exhaust gas recirculation pipe_II is provided, which branches from the exhaust pipe downstream of the turbine and opens into the inlet pipe upstream of the compressor, wherein a2) at least one particle filter_I is provided, which is located in the exhaust gas recirculation pipe_I or is located in the exhaust pipe upstream of the exhaust gas recirculation pipe_I, wherein the particle filter_I exhibits a 3/Ox-coating; b2) at least one particle filter_II is provided, which is located in the exhaust gas recirculation pipe_II or is located in the exhaust pipe upstream of the exhaust gas recirculation pipe_II, whereby the exhaust gas recirculation pipe_II branches upstream or downstream of the exhaust gas catalytic converter, wherein, with branching upstream of the exhaust gas catalytic converter, the particle filter_II exhibits a 3/Ox-coating, or, with branching downstream of the exhaust gas catalytic converter, the particle filter_II is located in the exhaust gas recirculation pipe_II; and that, downstream of the at least one particle filter, at least one cooler is provided inside the exhaust gas recirculation pipe.

It can also be of advantage if at least one further exhaust gas recirculation pipe is provided, which branches at the exhaust gas recirculation pipe_I and opens into the inlet pipe, wherein at least one of the further exhaust gas recirculation pipes is optionally provided with at least one further cooler. With the additional exhaust gas recirculation pipe widely differing architectures of the exhaust gas recirculation can be realized, in particular a maximum pressure EGR.

For this purpose, it can be advantageous if the further exhaust gas recirculation pipe branches downstream of the particle filter of the exhaust gas recirculation pipe_I. The further exhaust gas recirculation pipe is therefore subjected to purified exhaust gas.

For this purpose, it can also be advantageous if the main exhaust gas catalytic converter is provided downstream of the branching of the exhaust gas recirculation pipe_I or upstream of the branching of the exhaust gas recirculation pipe_II or downstream of the branching of the exhaust gas recirculation pipe_II. Depending on the positioning, a catalytic purification of the exhaust gas flow is ensured. In combination with coated particle filters, a complete catalytic purification of the entire exhaust gas flow can take place.

For this purpose, it can be advantageous, for example, with an HP-EGR if the cooler exhibits on the output side an exhaust gas reference temperature Ta, which lies above the dew point of the substances contained in the exhaust gas; for example: $250° \geq Ta \geq 100°$ or $200° \geq Ta \geq 105°$. The exhaust gas reference temperature Ta is in this case selected sufficiently high for a condensing of the substances contained in the exhaust gas as well as of water to be prevented as far as possible. Condensing of water would have the disadvantage that it would collect in any depressions of the EGR pipe, and might possibly be conveyed abruptly to the combustion system. Cooling to below 100° C. only takes place in the second cooling stage after mixing of exhaust gas and fresh air in the inlet line or in the charge-air line respectively, shortly before entering the engine. As a result of this, condensing water can pass directly into the engine combustion chamber, and, by evaporation, can exert a positive effect on the engine combustion. Due to the fact that the exhaust gas is purified by the particle filter, then, as explained hereinafter, despite the further cooling, there is no risk of sooting for a charge-air cooler close to the engine.

In this situation, it can be of advantage if the at least one further exhaust gas recirculation pipe opens into the inlet pipe upstream of the compressor or downstream of the compressor. With the further exhaust gas recirculation pipe, a maximum pressure EGR and a high pressure EGR can be realized.

It can also be advantageous if two compressors are arranged in the inlet pipe, whereby the at least one further exhaust gas recirculation pipe opens between the two compressors. By the use of two compressors, intermediate solutions of the maximum pressure EGR, the high pressure EGR, and/or the low pressure EGR can be realized.

In this connection, it can be of advantage if two compressors are arranged in the inlet pipe, and at least two further exhaust gas recirculation pipes are provided, which are connected in parallel via a common distribution pipe branching at the exhaust gas recirculation pipe_I, wherein at least one further exhaust gas recirculation pipe opens upstream of at least one of the compressors, and/or at least one further exhaust gas recirculation pipe opens downstream of at least one of the compressors. In this situation, preferably a turbine is allocated to each compressor. At least one exhaust gas recirculation pipe can also be a part of the distribution line, if it is configured as a continuation of the distribution pipe.

In this situation, advantageously a charge-air cooler and/or a charge-air choke valve can be provided in the inlet pipe, wherein the opening of the exhaust gas recirculation pipe_I is placed downstream of a position for the charge-air cooler and/or downstream of a position for the charge-air choke valve. In the inlet pipe, as a rule, only fresh air is conveyed as far as the opening of the EGR pipe. The charge-air cooler could in this case also be designated as a fresh-air cooler.

As an alternative, it can be advantageous if a charge-air cooler and/or a charge-air choke valve is provided in the inlet pipe, wherein the opening of the exhaust gas recirculation pipe is located upstream of a position for the charge-air cooler and downstream of a position for the charge-air choke valve. The purification of the recirculated exhaust gas by the particle filter ensures the effective use of the charge-air cooler for the fresh air-exhaust gas mixture. The sooting of the charge-air cooler is prevented by the use of the particle filter. Due to the use of an EGR pipe with the gasoline engine, soot particles and the exhaust gas temperature in high-load operation can be perceptibly reduced. As a result, with the use of a particle filter in the EGR pipe and/or with intensive cooling of the recirculated exhaust gas (EGR cooling), the charge-air cooling can be enhanced to the extent that the exhaust gas temperature can be reduced to the level of diesel engines, and the suction intake temperature upstream of the cylinder inlet can be reduced to the level of gasoline engines without EGR. As a result of this, the knocking tendency of the gasoline engines is perceptibly reduced and significant consumption improvements can be achieved.

It can be advantageous if the charge-air cooler exhibits on the outlet side a charge-air reference temperature Tu, with $Tu \leq 50°$ C. Due to the intensive cooling of the charge-air, the exhaust gas temperature of the gasoline engine can be reduced to the level of diesel engines (approx. 850° C.). This has a very positive effect on the knocking tendency of the gasoline engine, and significant improvements in fuel consumption are possible.

It can also be advantageous if, as a supplement to the charge-air cooler, a fresh-air cooler is located in the inlet pipe, wherein the fresh-air cooler is located upstream of the opening of the exhaust gas recirculation pipe. With the fresh-air cooler, in a first stage a separate cooling of the fresh air can take place before the mixing with the exhaust gas. However, because the temperature level of the compressed fresh air, at 150° C. to 160° C., is not so very high, the separate cooling of the fresh air can also be done without, wherein the fresh air-exhaust gas mixture, as described heretofore, can be cooled together in the charge-air cooler.

In this connection, it can be advantageous if the fresh-air cooler exhibits on the outlet side a fresh-air reference temperature Tf, with 150°>=Tf>=90°, and the charge-air cooler exhibits a charge-air temperature on the outlet side of maximum 30° C. to 40° C. or 45° C. to 50° C. The cooling performance attained in the fresh-air system is indeed relatively low, but is in any event advantageous in respect of a fresh air-exhaust gas mixture which is as cool as possible. With the use of the fresh-air cooler, the output of the charge-air cooler can be reduced accordingly. Moreover, still lower temperatures can be realized.

The reduced knocking tendency of the gasoline engine, and significant consumption improvements, can be achieved by the two-stage or three-stage cooling of the suctioned charge air by the EGR cooler, the charge-air cooler, and, as applicable, the fresh-air cooler, making use of the different temperature levels.

In this situation, it can be advantageous if the charge-air cooler is provided in the inlet pipe, wherein the opening of at least one further exhaust gas recirculation pipe is located upstream of a position for the charge-air cooler.

It can also be advantageous if a choke valve is provided in the exhaust gas recirculation pipe_I and/or in the exhaust gas recirculation pipe_II, by which, depending on the operating point, an exhaust gas mass flow inside the exhaust gas recirculation pipe can be adjusted, wherein the choke valve is located downstream of the particle filter, or the choke valve is located downstream or upstream of the cooler. In thrust phases of the engine, with the regulating valve it is possible for the regeneration of the particle filter to be influenced by the quantity of the recirculated fresh air. In special embodiments, the choke valve can also be arranged directly downstream of the particle filter. For this purpose, a structure arranged in a common housing is also possible. The temperature loading of the choke valve is at its lowest downstream of the cooler.

It can additionally be advantageous if in each case an additional cooler is provided inside the respective further exhaust gas recirculation pipe, or if in each case a further cooler is located in the distribution pipe upstream of the respective further exhaust gas recirculation pipe. In this way, the cooling capacity in the individual paths is ensured and appropriately distributed.

In addition, it can be advantageous if the exhaust pipe exhibits two parallel-located exhaust pipe sections, which can be switched by an adjustable valve, wherein the exhaust gas catalytic converter is located in one exhaust pipe section, and in the parallel exhaust pipe section the particle filter and the downstream branch for the exhaust gas recirculation pipe_II are provided. Accordingly, the further exhaust gas recirculation pipe can be circumvented, with the catalytic purification of the exhaust gas being guaranteed in every situation.

It can additionally be advantageous if the exhaust gas recirculation pipe_II and the further exhaust gas recirculation pipe are coupled by an adjustable valve, wherein a cooler is provided downstream of the valve and/or a choke valve is provided downstream of the cooler. With this architecture arrangement, the further exhaust gas recirculation pipe can be connected to the cooler and the inlet pipe, and a maximum pressure EGR can be realized. As an alternative, the exhaust gas recirculation pipe_II can be connected to the cooler and the inlet pipe, and a low-pressure EGR can be realized.

It can additionally be advantageous if a choke valve is provided in the respective further exhaust gas recirculation pipe, wherein the choke valve is provided optionally or preferably downstream of the respective further cooler. The various different further exhaust gas recirculation pipes can therefore be activated at will, with regard to the point of time and the exhaust gas quantity. In addition, the choke valve can be protected against excessive temperature loading.

It can also be advantageous if, downstream of the main exhaust gas catalytic converter, a main particle filter is provided, which is free of a catalytically effective coating, for the conversion of CO, HC and/or NOx. Accordingly, a complete purification of the exhaust gas from particles is ensured. Both a main particle filter can be located in the exhaust pipe as well as a supplementary particle filter in the exhaust gas recirculation pipe. This can be done irrespective of whether the exhaust gas recirculation pipe branches upstream or downstream of the main particle filter. In this situation, the porosity of the main particle filters can be greater than that of the particle filter in the exhaust gas recirculation pipe. Accordingly, the filter capacity of the particle filter in the exhaust gas recirculation pipe is greater than that of the main particle filter. Irrespective of the filter criteria which are set for the exhaust gas being expelled to the surrounding environment, due to the dirt contamination effect the recirculated exhaust gas should be as free of particles as possible.

It can be advantageous, moreover, if the EGR pipe is allocated to one single cylinder outlet of the gasoline engine. The EGR pipe therefore conveys only the exhaust gas quantity from this one cylinder outlet. The exhaust gas quantity can be varied by changing the control times of the valves and/or by the choke valve of the EGR pipe.

It can also be advantageous if the turbine is configured as a VTG turbine. A VTG turbine is a turbine with variable turbine geometry, and ideally is infinitely adjustable.

Only the use of EGR systems with particle filters allows for the gasoline engine exhaust gas temperature upstream of the VTG turbine to be reduced to a temperature level which corresponds to today's thermal and economical loading limits of conventional VTG turbines from diesel engines.

The lower exhaust gas temperature opens up a greater range of applications for VTG turbines, and these therefore for the first time come into focus as interesting alternatives to two-stage charging systems for the gasoline engine. The control range extended by the VTG function of the exhaust gas counterpressure upstream of the turbine inlet allows for EGR systems in accordance with the HP or MP configuration to achieve an extension of the function range to higher exhaust gas recirculation rates (EGR rates), in particular at low engine revolution speeds and high loads (LET—low end torque). As a result, HP or MP configurations can now cover mapping ranges which were hitherto only attainable with an LP configuration, and in this context they retain their advantage in the dynamic response behaviour due to the short regulating stretch, and possibly improved it. This advantage is still further enhanced by the use of VTG turbines, since the extended and flexible control of the exhaust gas counterpressure allows for an extended and flexible adjustment of the EGR rate. The adjustment or adaptation of the EGR rate or of the exhaust gas counterpressure is increasingly important at higher EGR rates, since the gasoline engine reacts much more sensitively, in comparison with the diesel engine, to changing EGR rates.

EGR systems with particle filters therefore make the use of VTG turbines in gasoline engines attractive, and offer an economical alternative to two-stage systems. Conversely, the use of VTG turbines in HP and MP configurations ensures high EGR rates in further operational ranges. Expensive, and concomitantly highly alloyed VTG turbines, such as are known for gasoline engines, without separate or two-stage exhaust gas recirculating, and their costs, can be avoided.

The exhaust gas recirculation system according to the invention ensures the configuration of a gasoline engine with a displacement of a piston within a cylinder exhibiting a volume Vh and a compression volume Vk, wherein a compression ratio Vv=(Vh+Vk)/Vk is applied, with $15:1<=Vv<=10:1$. The compression ratio should be set as high as possible, and amounts preferably to 1:11, 1:12 1:13, 1:14 or 1:15. Due to massive reduction of the knocking tendency and by corresponding enlargement of the ignition angle, substantially higher compression ratios can be realized with the gasoline engine. The sum of the displacement Vh and compression volume Vk provides the overall combustion chamber volume.

In order to avoid the occurrence of abrasion into the suction tract due to the EGR with the use of a filter, a further filter or screen can be located downstream of the particle filter in the EGR.

Also advantageous is an exhaust gas system and/or a gasoline engine with an exhaust gas recirculation system or a gasoline engine with a displacement of a piston within a cylinder exhibiting at least a volume Vh and with at least one exhaust gas recirculation system and/or an exhaust gas system as described heretofore, wherein the particle filter exhibits a total volume Vf, wherein, for the total volume Vf, the following applies: $0.1\ Vh<=Vf<=1\ Vh$ or, in particular, $0.1\ Vh<=Vf<=0.5\ Vh$, or if a plurality of particle filters are provided which together exhibit the total volume Vf. The total volume Vf relates to the geometric volume of the particle filter, concomitantly the volume which the housing exhibits to accommodate the particle filter. Volume portions of the housing which are necessary for bearing means, such as bearing mats, are not taken into account in the determination of the geometric volume of the particle filter. The various different particle filters can be located in the different exhaust pipes or exhaust gas recirculation pipes, and connected in series or in parallel.

Also advantageous is a method for the operation of a gasoline engine with which the exhaust gas recirculation rate of the external EGR during operation is raised during operation, at least for the HP-EGR and at least in the high load range and under full load to a value of up to 20%, to 30%, to 40% or up to 50%, and/or with ignition angle adjustment, the combustion centre of gravity is moved closer to the thermodynamically optimum value of 8° crank angle, and/or the fuel quantity to be delivered to the gasoline engine is reduced, and a full-load enrichment is avoided, wherein optionally one of the method steps is repeated at least once. The raising of the exhaust gas recirculation rate is also possible in the part-load range, although to a somewhat lesser degree.

Against the background of the purified and optimally cooled state of the recirculating exhaust gases, it is possible for the exhaust gas recirculation rate to be raised during operation, at least for the HP-EGR and at least in the high-load range, up to the full load of the engine, to values of up to 20%, 30%, 40% or up to 50%. As a result, the knocking tendency of the gasoline engine is reduced to such an extent that, by setting the ignition angle to early, the combustion centre of gravity can be brought close to the thermodynamically optimum value. Accordingly, the usual distances between the centre of gravity and the optimum referred to (8° crank angle after the TDC), at present, for example, 10° to 15° crank angle, can be reduced from 3° to 7°, 5° to 10° or 7° to 12°. The reduction takes place in small steps, by the continuous optimization of the ignition angle.

Thanks to the measures described heretofore, the exhaust gas temperature is perceptibly reduced, and the combustion stability perceptibly increased. As a result, the possibility is provided of the exhaust gas recirculation rate being increased further, as a result of which the knocking tendency of the gasoline engines is further reduced, and the centre of gravity can be further optimized.

By reducing the knocking tendency, optimization of the centre of gravity, and increasing the combustion stability, in the final analysis it is possible to do without a full-load enrichment as a component protection, since the exhaust gas temperature is perceptibly reduced. The full-load enrichment can likewise be reduced in steps, by at least 5% to 10% or at least 10% to 30% or at least 40% to 70%. As a result, full-load enrichment should not happen, and concomitantly a stoichiometric ratio be applied.

It is therefore possible for gasoline engines to be used which have a perceptibly raised compression ratio, such that the fuel consumption advantage inherent with this can be applied in the entire mapping range of the gasoline engine.

As a result, the EGR compatibility of the engine is again increased, which again makes possible an increase in the exhaust gas recirculation rate, which in turn provides the advantageous effects described.

This self-enhancing effect described heretofore can be brought to an end either by a new knock limit being reached, the combustion becoming too slow, or misfiring occurring.

BRIEF DESCRIPTION OF THE DRAWINGS

Further advantages and details of the invention are explained in the claims and in the description, and represented in the figures. The figures show:

FIGS. 6a-6c partial representation of the different arrangement from FIG. 1;

DETAILED DESCRIPTION OF THE INVENTION

Figure 1:
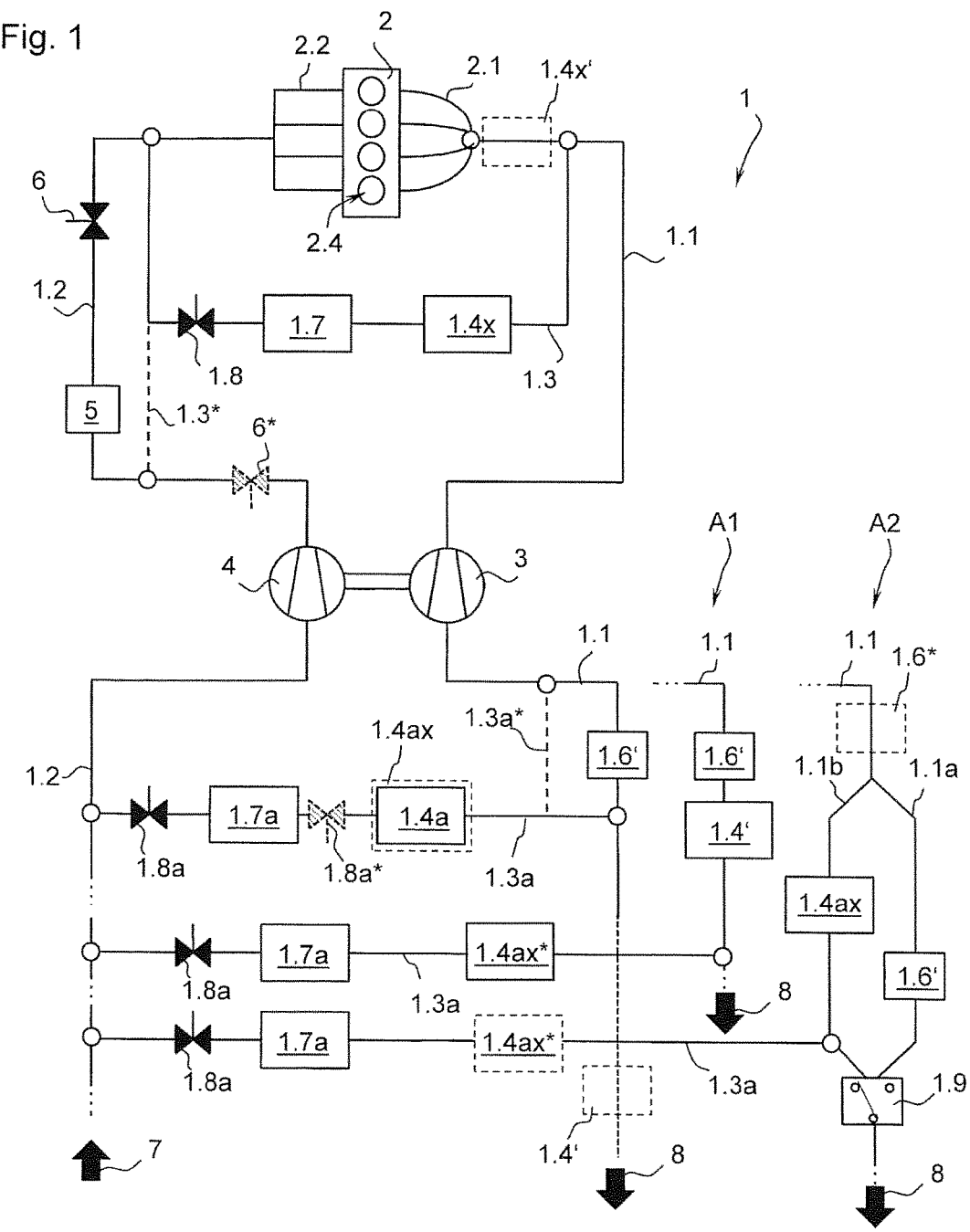
FIG. 1 a principle sketch of a combinable HP and LP-EGR.

In all the principle sketches according to FIGS. 1-6, an exhaust gas recirculation system 1 (EGR system) is represented which is integrated into the exhaust gas and charge-air system of a gasoline engine 2 exhibiting a displacement 2.4 of a piston within a cylinder with exhaust manifold 2.1 and inlet manifold 2.2, as well as an exhaust gas turbine 3 and charge-air compressor 4. The exhaust gas and charge-air system has an exhaust pipe 1.1, attached to the exhaust manifold 2.1 of the gasoline engine 2, into which the turbine 3 is integrated. At the end of the exhaust pipe 1.1, exhaust gas 8 leaves the exhaust gas recirculation system 1 and flows into the further exhaust gas stretch, not shown. Also provided is an inlet pipe 1.2, connected to the inlet manifold 2.2 of the gasoline engine 2, into which the compressor 4 is integrated. The inlet pipe 1.2 is provided with fresh air 7 via an air delivery system, not shown. As a supplement, at least one exhaust gas recirculation pipe 1.3, 1.3a, 1.3b (EGR pipe) is provided, which branches off at the exhaust pipe 1.1 and opens into the inlet pipe 1.2.

Arranged either in the EGR pipe 1.3, 1.3a, 1.3b is a particle filter 1.4x, 1.4ax, or alternatively (represented by broken lines), in the exhaust pipe 1.1 upstream of the EGR pipe 1.3, a main particle filter 1.4x' is arranged, which filters the recirculated or recirculating exhaust gas 8. The respective particle filter 1.4x, 1.4ax, 1.4x' is provided with a 3-way catalytic converter coating for the oxidation of HC and CO or the reduction of NOx, in order to fulfil the 3-way catalytic converter function. At least one HC oxidation coating is provided for the oxidation of HC and CO. This also applies to all the particle filters referred to hereinafter. Both variants of the coating are referred to collectively hereinafter under the designation of 3/Ox-coating.

In addition, in the respective EGR pipe 1.3, 1.3a downstream of the particle filter 1.4x, 1.4ax at least one EGR cooler 1.7, 1.7*, 1.7a is provided. Located downstream of the respective EGR cooler 1.7, 1.7a, 1.7b, or upstream of the opening into the inlet pipe 1.2 is an EGR choke valve 1.8, 1.8a, 1.8b, for regulating the mass flow inside the EGR pipe 1.3, 1.3a.

In principle, a distinction is made between three architectures of the exhaust gas recirculation system, depending on the branching of the EGR pipe from the exhaust pipe 1.1 and the opening of the EGR pipe into the inlet pipe 1.2.

The combination of branching of the EGR pipe_I 1.3 upstream of the turbine 3 and the opening of the EGR pipe_I 1.3 downstream of the compressor 4 is designated as high-pressure EGR (HP-EGR).

The combination of branching of the EGR pipe I_1.3 upstream of the turbine 3 and opening of the EGR pipe_I 1.3 upstream of the compressor 4 is designated as maximum pressure EGR (MP-EGR).

The combination of branching of the EGR pipe_II 1.3a downstream of the turbine 3 and opening upstream of the compressor 4 is designated as low-pressure EGR (LP-EGR). The three EGR architectures designated heretofore can be used individually or combined with one another.

For the further influencing of the recirculated exhaust gas quantity, a choke valve can be installed in the inlet pipe 1.2 upstream of the inlet point of the exhaust gas recirculation pipe_I 1.3 into the inlet pipe 1.2.

In the arrangement shown according to FIG. 1 different EGR architectures are represented as supplementing or alternative to one another. Provided inside the inlet pipe 1.2, downstream of the compressor 4 and upstream of the opening of the EGR pipe 1.3 are a charge-air cooler 5 and a charge-air choke valve 6.

There is an HP-EGR, formed by the EGR pipe_I 1.3, which branches upstream of the turbine 3 and opens downstream of the compressor 4 into the inlet pipe 1.2.

The opening of the charge-air choke valve 6 takes place downstream. Alternatively, the EGR pipe_I 1.3* opens upstream of the charge-air choke valve 6 and upstream of the charge-air cooler 5. In this case, the charge-air choke valve 6* is likewise located upstream of the opening of the EGR pipe_I 1.3*.

In the inlet pipe 1.2, as a rule, fresh air 7 is conveyed as far as the opening of the EGR pipe_I 1.3. The charge air is composed of the fresh air 7 and the recirculated exhaust gas 8. The particle filter can alternatively, as a main particle filter 1.4x' according to FIG. 1 (shown as broken lines), also be located in the exhaust pipe 1.1 upstream of the EGR pipe_I 1.3, such that it supplies the main exhaust pipe 1.1.

Downstream of the turbine 3, provided in the exhaust pipe 1.1 is a main exhaust gas catalytic converter 1.6', which is configured as a 3-way catalytic converter. Irrespective of the exemplary embodiments described hereinafter, the catalytic converter 1.6' used in each case can in principle be a 3-way catalytic converter. A pure oxidation catalytic converter 1.6 comes into consideration in particular if the gasoline engine 2 concerned is a lean combustion engine.

Downstream of the catalytic converter 1.6', additionally or alternatively, an EGR pipe_II 1.3a branches off, which opens upstream of the compressor 4 and forms an LP-EGR. Provided inside this are the particle filter_II 1.4a and the EGR cooler_II 1.7a and an EGR choke valve 1.8a. In principle, the choke valve 1.8a* can also be provided upstream of the cooler_II 1.7a.

As an alternative to this, the EGR pipe_II 1.3a* can branch off upstream of the catalytic converter 1.6'. In this case, the particle filter_II 1.4ax with the 3/Ox-coating is involved, concomitantly a 3-way or HC oxidation catalytic converter coating, in order to compensate for the circumventing of the catalytic converter 1.6'. It is also to be noted here that, irrespective of the exemplary embodiments described hereinafter, the coating used in each case for the particle filter_II 1.4x, 1.4ax can in principle be a 3/Ox-coating.

As a supplement (represented by broken lines), a main particle filter 1.4' can be located in the exhaust pipe 1.1 downstream of the EGR pipe_II 1.3a. In this situation, the porosity of the main particle filter 1.4' can be greater than that of the particle filter 1.4ax in the EGR pipe_II 1.3a. Accordingly, the filtering capacity of the particle filter_II 1.4ax is greater than that of the main particle filter 1.4'.

As an alternative A1 to this LP-EGR described heretofore, the catalytic converter 1.6' and downstream the main particle filter_I 1.4' are provided in the main exhaust gas pipe 1.1, wherein the EGR pipe_II 1.3a first branches off downstream of the main particle filter 1.4'. In the EGR pipe_II 1.3a, in addition to the EGR cooler_II 1.7a and the EGR choke valve 1.8a, an additional particle filter 1.4ax* is arranged. This ensures the most complete purification possible of the recirculated exhaust gas, in order to protect the cooler_II 1.7a. Here too, the porosity of the main particle filter 1.4' can be greater than that of the particle filter_II 1.4ax in the EGR pipe_II 1.3a. Accordingly, the filtering capacity of the particle filter_II 1.4ax is greater than that of the main particle filter 1.4'.

As a further alternative A2 to the LP-EGR, the exhaust pipe 1.1 is provided with two parallel arranged exhaust pipe sections 1.1a, 1.1b, which can be switched by with a controllable valve 1.9. Located in the exhaust pipe section 1.1a is a main exhaust gas catalytic converter 1.6'. Arranged in the parallel exhaust gas pipe section 1.1b are the coated particle filter_II 1.4ax and the branch for the EGR pipe_II 1.3a. Accordingly, a switchable bypass is provided for the EGR pipe_II 1.3a, wherein in both cases the 3-way catalyzation, or at least the HO oxidation catalyzation, is attained in the exhaust pipes 1.1a, 1.1b.

The adjustable valve 1.9 can also be configured in such a way that exhaust gas part quantities of different quantities can flow simultaneously through the parallel exhaust pipe sections 1.1a, 1.1 b.

As a further alternative, in the exhaust pipe section 1.1b, a non-coated particle filter_II 1.4a can also be used (not represented). In this case, however, the main exhaust gas catalytic converter 1.6* (represented by broken lines) is located in the exhaust pipe 1.1 upstream of the division into the two exhaust pipe sections 1.1a, 1.1b, in order to ensure, in every position of the valve 1.9, a catalytic purification of the exhaust gas 8. In this case, in addition, a coated particle filter_II 1.4ax* would be provided in the in EGR pipe_II 1.3a (represented by broken lines), in order to ensure the purification of the exhaust gas in the EGR pipe_II 1.3a.

Figure 6A:
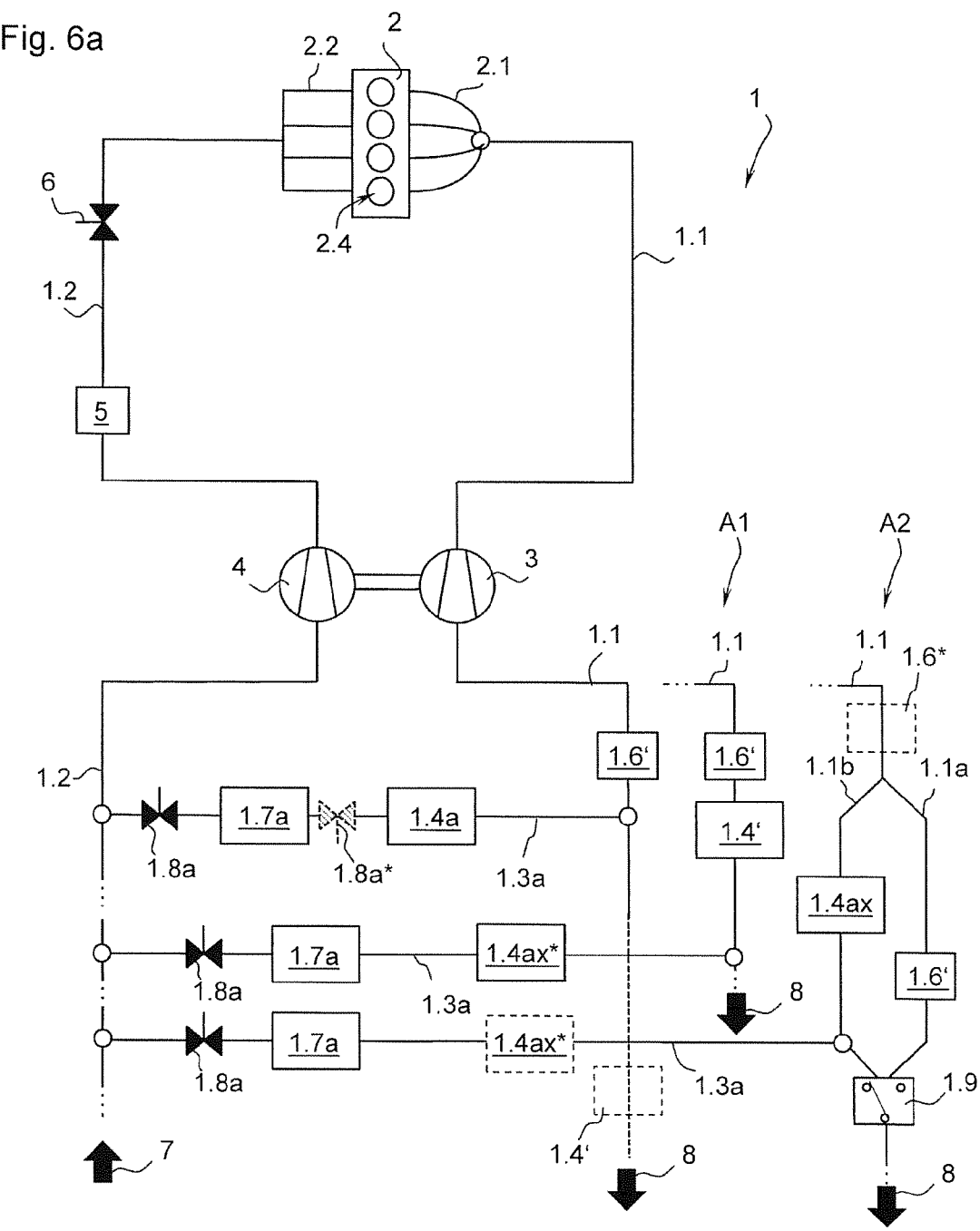
Figure 6C:
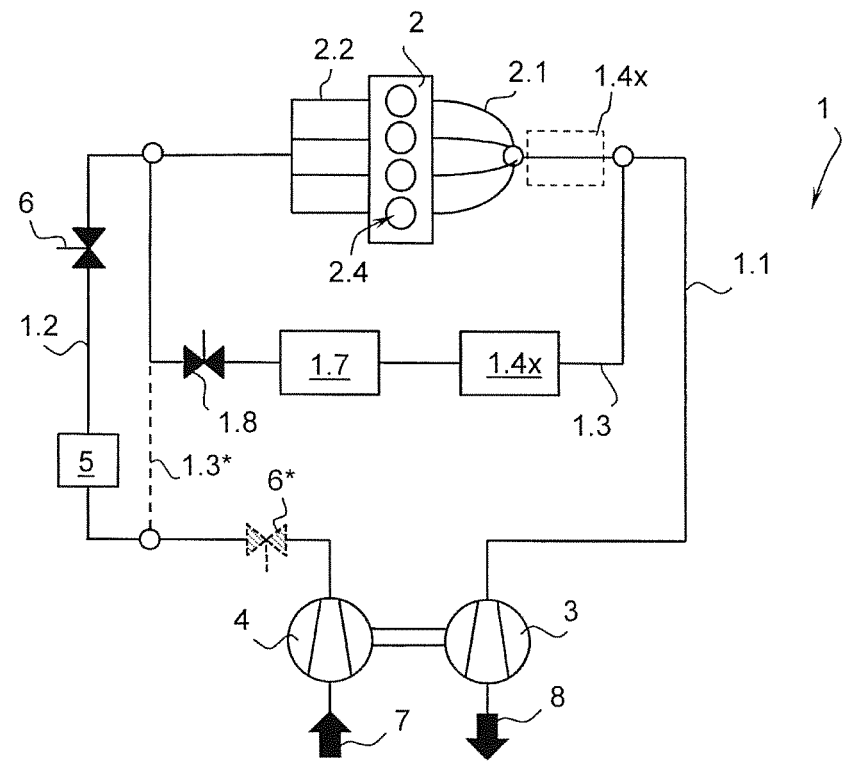

The HP-EGR described in FIG. 1 on the one hand, and the various different LP-EGR architectures which can be used individually or in combination, are once again represented in FIGS. 6a, 6b, 6c separated according to HP and LP. The alternative embodiment, contained in the LP-EGR, of the EGR pipe_II 1.3*, which branches upstream of the catalytic converter 1.6', is represented by itself in FIG. 6c. The variant of the downstream main particle filters 1.4' in the main exhaust pipe 1.1 is likewise contained therein.

Figure 2:
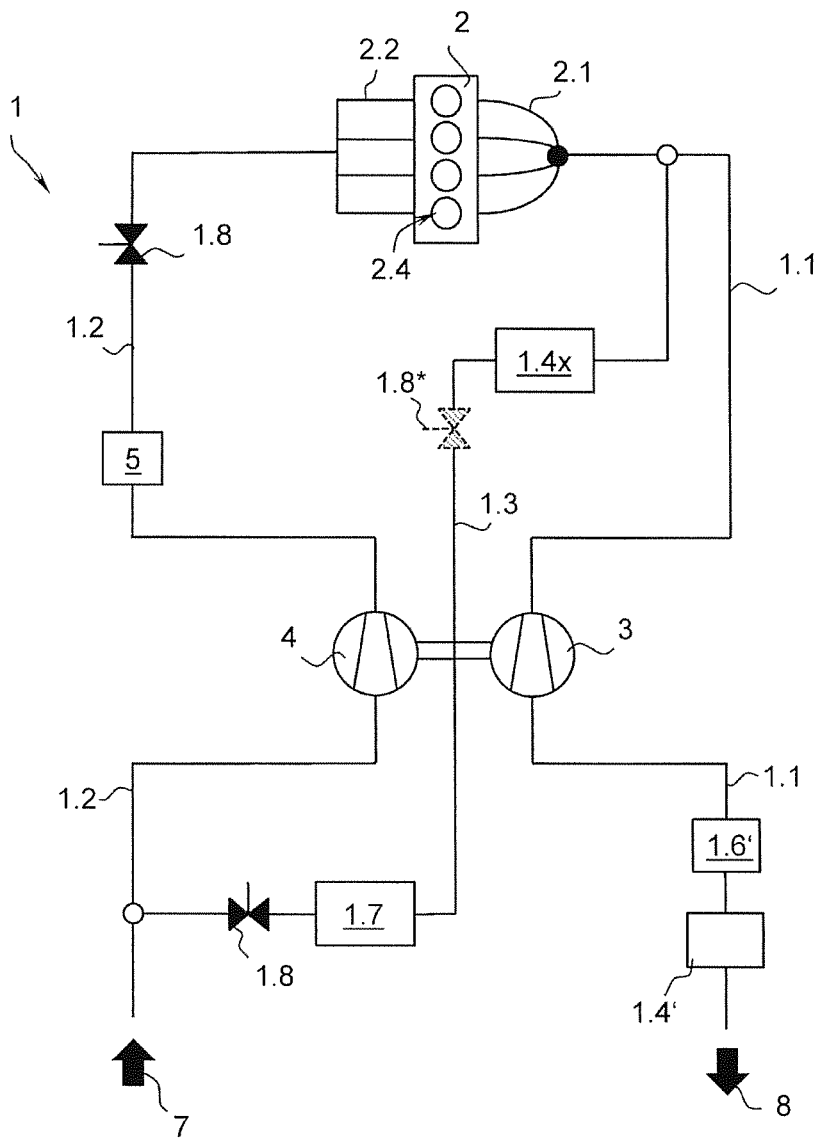
FIG. 2 a principle sketch of an MP-EGR.

FIG. 2 shows a configuration of an MP-EGR. The particle filter_II.4x located in the EGR pipe_I 1.3 exhibits a catalytic converter coating. Provided as a supplement to this in the exhaust pipe 1.1, downstream of the turbine 3, is a main exhaust gas catalytic converter 1.6', preferably a 3-way catalytic converter. The choke valve 1.8 is located downstream of the cooler_I 1.7. The choke valve 1.8* can, as an alternative, also be provided downstream of the particle filter_I 1.4x. As a supplement to this, provided in the exhaust pipe 1.1 downstream of the main exhaust gas catalytic converter 1.6' is a non-coated main particle filter 1.4'.

Figure 3A:
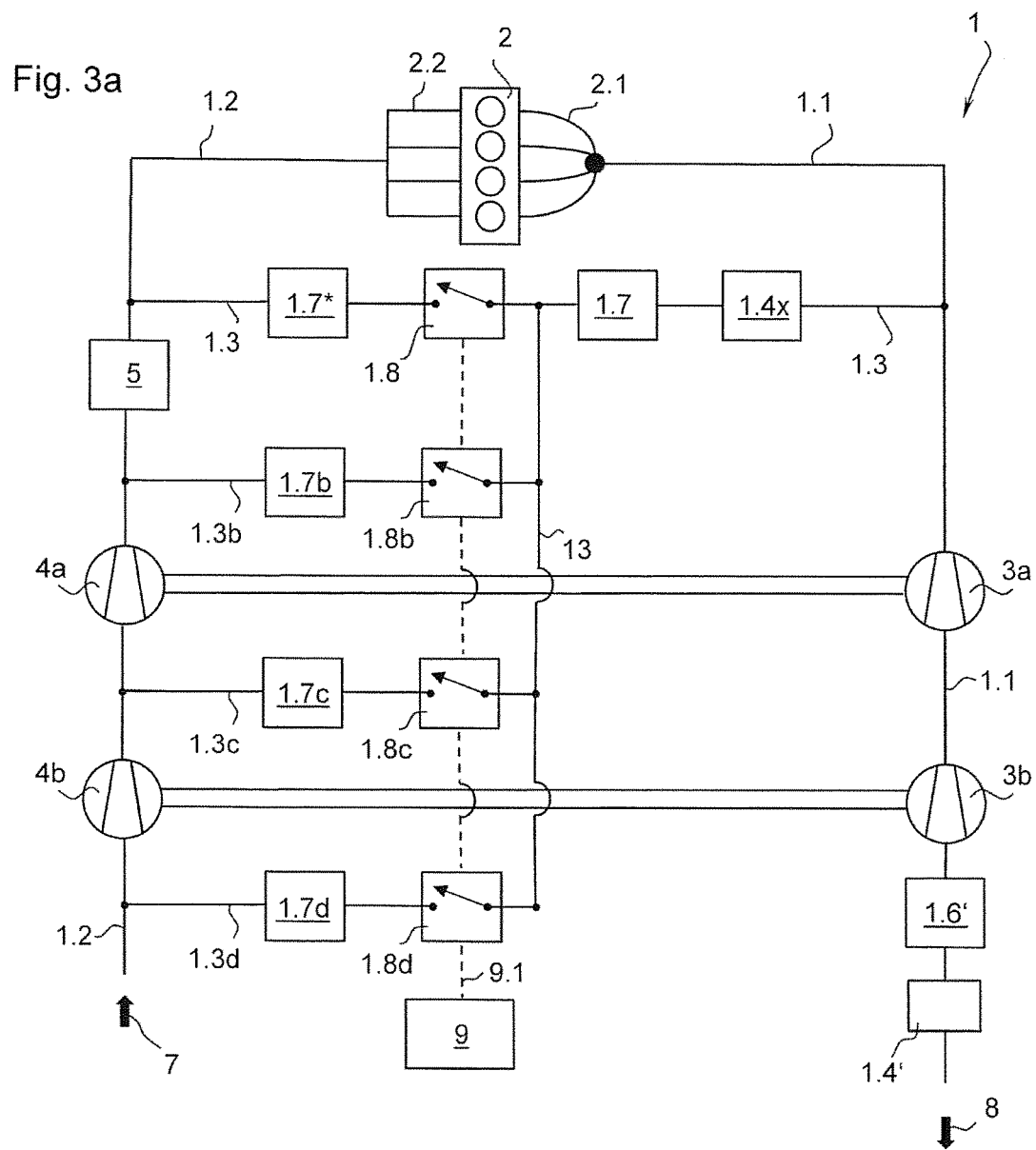
FIGS. 3a, 3b principle sketches of a combined HP and MP-EGR, with different cooler arrangements and inlets into the inlet pipe.

According to the embodiment in FIG. 3a, starting from the EGR pipe_I 1.3, which branches at the exhaust pipe 1.1, the exhaust gas recirculation continues via further parallel arranged EGR pipes 1.3b-1.3d. Arranged in the EGR pipe_I 1.3 are the particle filter_I 1.4x with the catalytic converter coating, and the cooler_I 1.7. The EGR pipes 1.3b-1.3d in each case branch off at a distribution pipe 13, which in turn branches at the EGR pipe_I 1.3 downstream of the cooler_I 1.7. All the EGR pipes 1.3-1.3d open at the inlet pipe 1.2. Each of these EGR pipes 1.3-1.3d has downstream of the distribution pipe 13 a choke valve 1.8-1.8d, wherein all the choke valves 1.8-1.8d are connected via a control line 9.1 to a control unit 9 for controlling or regulating the position of the respective choke valve 1.8-1.8d, and can be individually controlled. Provided downstream of the respective choke valve 1.8-1.8d, in the respective EGR pipe 1.3-1.3d, is an additional or further cooler 1.7*, 1.7b-1.7d. The inlet pipe 1.2 exhibits two compressors 4a, 4b, which in each case are coupled to a turbine 3a, 3b of the exhaust pipe 1.1. The EGR pipes 1.3, 1.3b both open downstream of the compressor 4a and form an HP-EGR. The EGR pipe 1.3b opens upstream of the charge-air cooler 5, while the EGR pipe_I 1.3 opens downstream of the charge-air cooler 5.

The EGR pipe 1.3d opens upstream of the compressor 4b and forms an MP-EGR. The EGR pipe 1.3c, however, opens between the two compressors 4a, 4b, and therefore forms a reduced MP-EGR.

With regard to the embodiment in FIG. 3a, one of the two EGR coolers 1.7, 1.7* in the EGR pipe_I 1.3 can optionally be omitted (not represented).

Located downstream of the turbines 3a, 3b is a 3-way catalytic converter (main exhaust gas catalytic converter) 1.6', starting from which the exhaust gas 8 or the main gas flow is conveyed into the further exhaust gas system. As a supplement to this, located in the exhaust pipe 1.1, downstream of the main exhaust gas catalytic converter 1.6', is a non-coated main particle filter 1.4'.

Figure 3B:
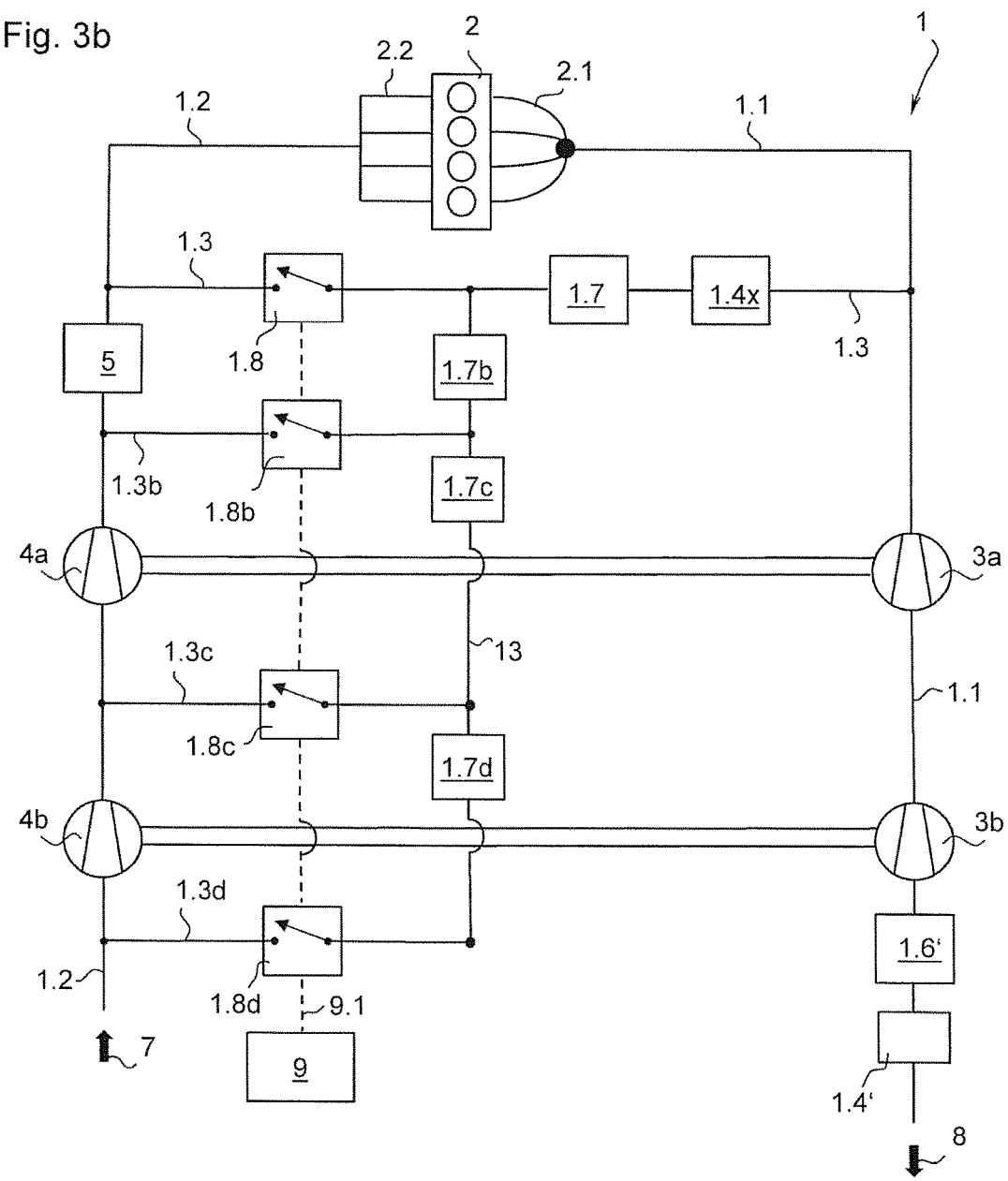

The exemplary embodiment according to FIG. 3b is configured in a similar manner. In this situation, a cooler_I 1.7 is provided in the EGR pipe_I 1.3, upstream of the branching of the distribution pipe 13, and three further coolers 1.7b-1.7d are located in the distribution pipe 13, in each case upstream of the branching of the respective EGR pipe 1.3b-1.3d. Accordingly, the additional cooler 1.7* is no longer necessary, as the case is with the exemplary embodiment according to FIG. 3a.

Both exemplary embodiments according to FIGS. 3a and 3b ensure an extremely flexible EGR arrangement, such that an extensive particle filtering and a regeneration of the particle filter_I 1.4x on the one hand, and, on the other, the delivery to meet the requirement of cooled exhaust gas 8 into the inlet pipe 1.2 for a full operational range of the engine, are ensured at all times.

Figure 4A:
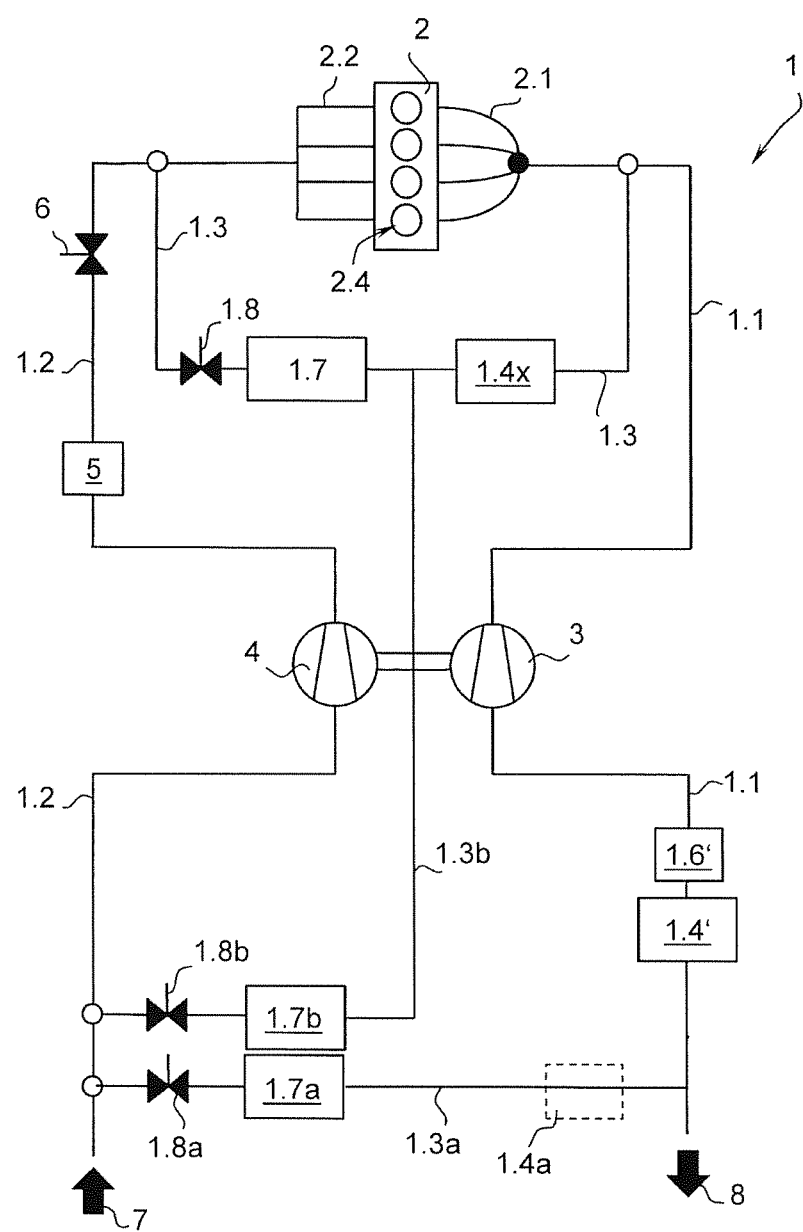
FIGS. 4a, 4b principle sketches of a combined HP, MP and LP-EGR, with different cooler arrangements and inlets into the inlet pipe.
Figure 4B:
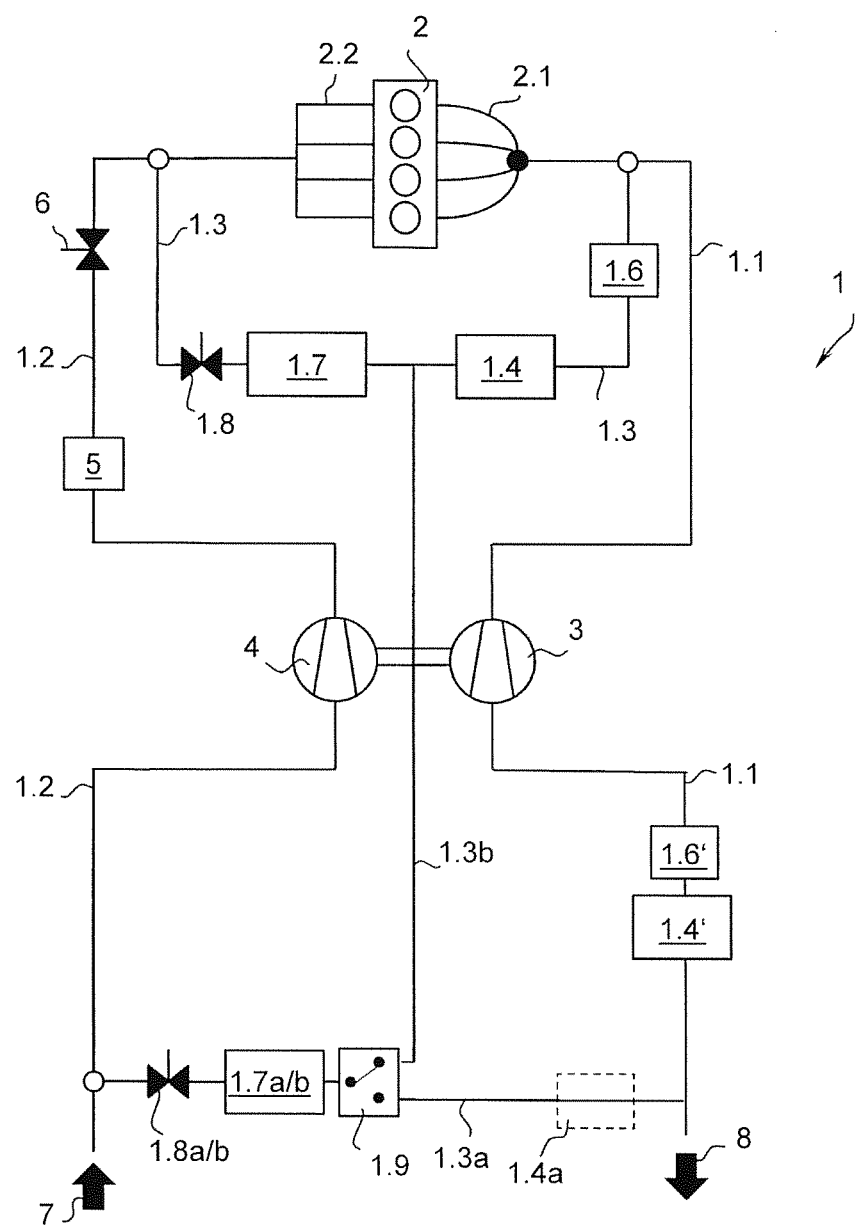

The exemplary embodiments according to FIGS. 4a, 4b has an HP-EGR, an MP-EGR, and an LP-EGR. Located in the inlet pipe 1.2 are the charge-air cooler 5 and the charge-air-choke valve 6, while the exhaust pipe 1.1 downstream of the turbine 3 is fitted with a 3-way catalytic converter 1.6' and a downstream particle filter 1.4a.

According to the exemplary embodiment in FIG. 4a, provided in the EGR pipe_I 1.3 is first of all a coated particle filter_I 1.4x. Following this, a further EGR pipe 1.3b branches off. While the EGR pipe_I 1.3 as an HP-EGR opens downstream of the charge-air choke valve 6 at the exhaust pipe 1.1, the further EGR pipe 1.3b, as an MP-EGR, opens upstream of the compressor 4. Provided in the EGR pipe_I 1.3, downstream of the further EGR pipe 1.3b are the cooler_I 1.7 and a downstream choke valve 1.8. Provided in the further EGR pipe 1.3b are likewise a further cooler 1.7b and a downstream choke valve 1.8b.

As a supplement to this, a second EGR pipe_II 1.3a is provided, which branches downstream of the main exhaust gas catalytic converter 1.6' and downstream of the main particle filters 1.4', and concomitantly downstream of the turbine 3, at the exhaust pipe 1.1. It likewise has a cooler_II 1.7a and a downstream choke valve 1.8a, before it opens at the inlet pipe 1.2 upstream of the compressor 4, and therefore represents an LP-EGR. As a supplement or alternative (represented by broken lines), the particle filter_II 1.4a can be located in the EGR pipe_II 1.3a.

Both the HP-EGR as well as the MP-EGR and the LP-EGR can be realized in any combination.

As a departure from the exemplary embodiment according to FIG. 4a, in the exemplary embodiment according to FIG. 4b the further EGR pipe 1.3b and the EGR pipe_II 1.3a are coupled via an adjustable valve 1.9. This has the advantage that a cooler 1.7a/b and a choke valve 1.8a/b are less necessary. However, in addition or as an alternative to the HP-EGR, only the MP-EGR or the LP-EGR are realized. In addition, the particle filter_I 1.4 in the EGR pipe_I 1.3 is non-coated, such that an additional exhaust gas catalytic converter 1.6 is provided upstream. This possibility always pertains as an alternative to the coated particle filter.

Figure 5A:
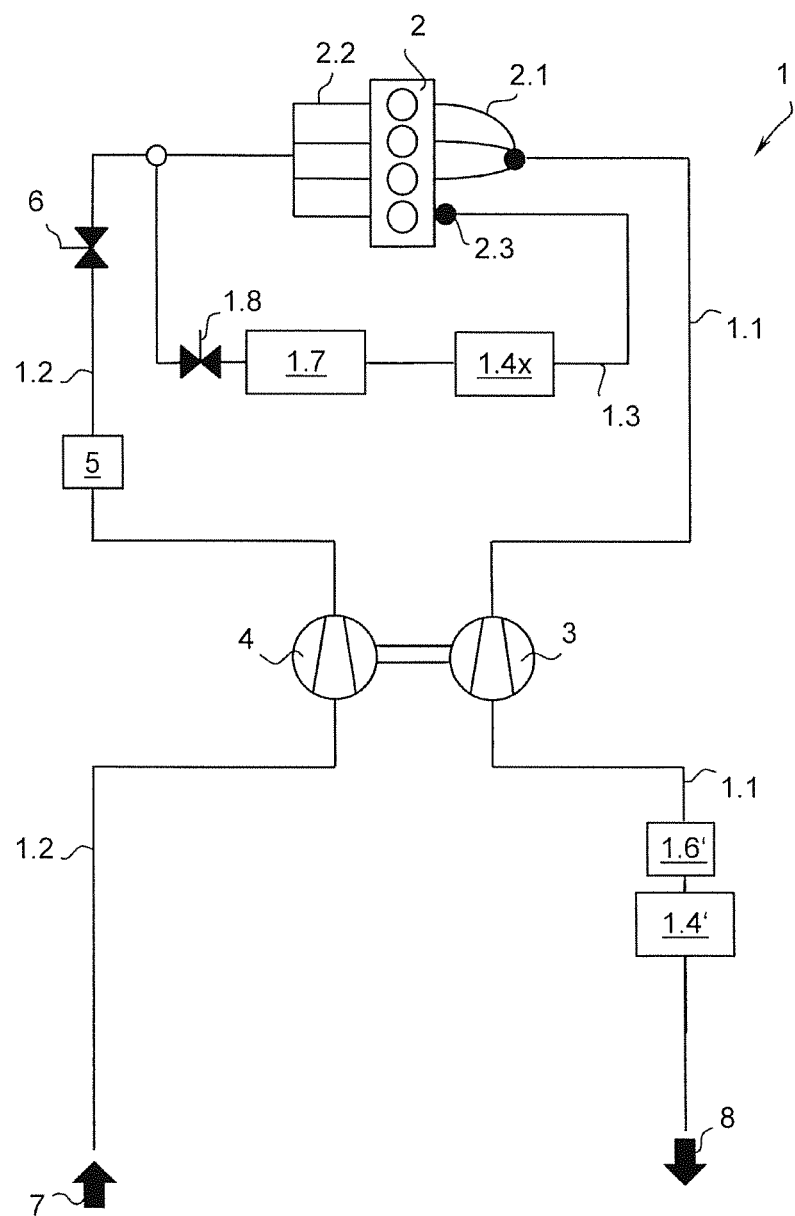
FIGS. 5a, 5b principle sketches of a partial HP or MP-EGR, with which the entire exhaust gas of a cylinder is being recirculated.
Figure 5B:
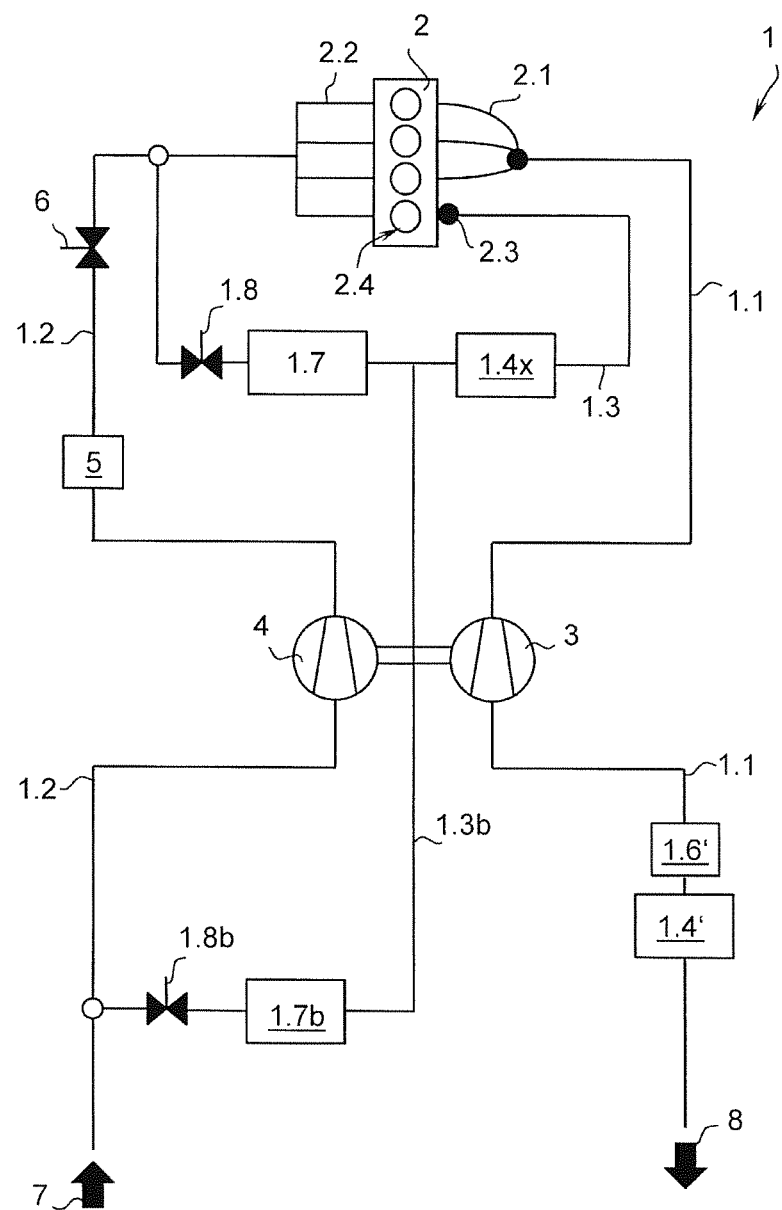

With the exemplary embodiments according to FIGS. 5a and 5b, the EGR pipe_I 1.3 is allocated to one single cylinder outlet 2.3 of the gasoline engine 2, and conveys the exhaust gas quantity of this cylinder outlet 2.3. Located in the inlet pipe 1.2 are the charge-air cooler 5 and the charge-air choke valve 6, while the exhaust pipe 1.1 downstream of the turbine 3 is fitted with a 3-way catalytic converter 1.6' and a downstream main particle filter 1.4'.

An HP-EGR is configured according to the exemplary embodiment in FIG. 5a. The EGR pipe_I 1.3 has a coated particle filter_I 1.4x and a downstream cooler_I 1.7 as well as, located downstream of the cooler_I 1.7, a choke valve 1.8.

In one exemplary embodiment which is not shown, a non-coated particle filter_I 1.4 can also be provided in combination with a 3/Ox-catalytic converter in the EGR pipe_I 1.3.

According to the exemplary embodiment in FIG. 5b, an MP-EGR is supplemented. For this purpose, a further EGR pipe 1.3b branches off between the coated particle filter_I 1.4x and the cooler_I 1.7, which opens upstream of the compressors 4. Located in this further EGR pipe 1.3b are likewise a further cooler 1.7b and a downstream choke valve 1.8b. In an exemplary embodiment not shown, a non-coated particle filter 1.4 can also be provided in combination with a 3/Ox-catalytic converter in the EGR pipe_I 1.3.

Figure 7:
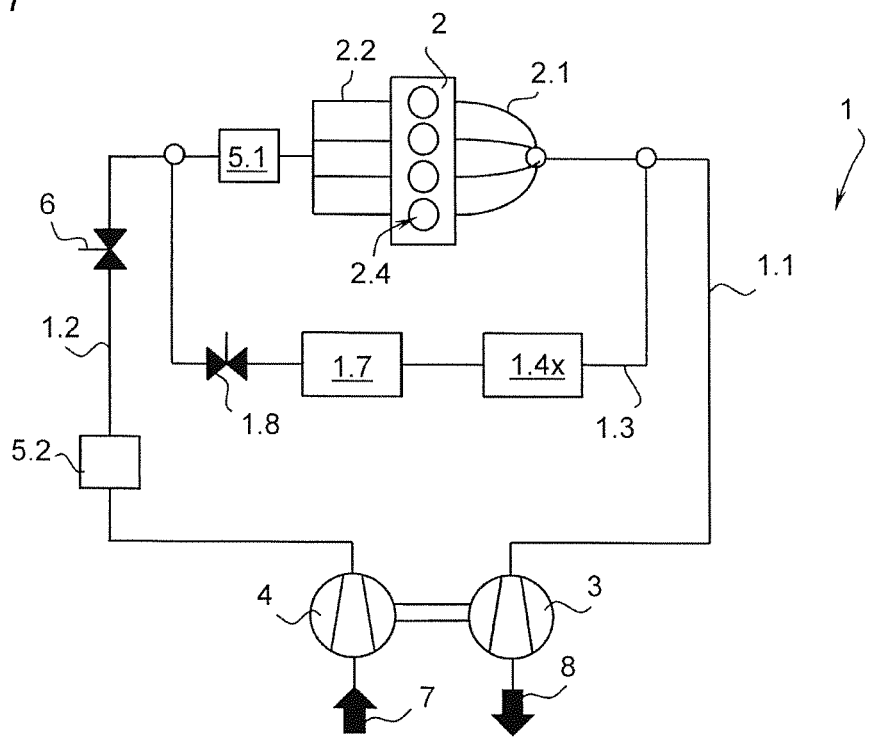
FIG. 7 a principle sketch of the HP-EGR according to FIG. 1 with charge-air and fresh-air cooler.

The exemplary embodiment according to FIG. 7 corresponds essentially, up to the position of the charge-air choke valve 6, to the HP-EGR architecture according to FIG. 1 alone. Two coolers are provided in the inlet pipe 1.2, however. A charge-air cooler is located 5.1 downstream of the opening of the EGR pipe_I 1.3, and a second cooler, referred to as a fresh-air cooler 5.2, is located upstream of the opening of the EGR pipe_I 1.3. In the downstream charge-air cooler 5.1, the compressed, and, if appropriate, pre-cooled fresh air 7, together with the recirculated and pre-cooled exhaust gas 8, are lowered to the desired charge-air temperature of preferably 30° C. to 40° C. The turbine 3 is a VTG turbine in a design and with material properties such as are usual with diesel engines. The particle filter_I 1.4x is configured as coated.

REFERENCE LIST 1 exhaust gas recirculation system
1.1 exhaust pipe, main exhaust pipe
1.1a exhaust pipe section
1.1b exhaust pipe section
1.2 inlet pipe
1.3 exhaust gas recirculation pipe_I, EGR pipe
1.3* exhaust gas recirculation pipe_I, EGR pipe, alternative
1.3a exhaust gas recirculation pipe_II, EGR pipe
1.3a* exhaust gas recirculation pipe_II, EGR pipe, alternative
1.3b further exhaust gas recirculation pipe
1.3c further exhaust gas recirculation pipe
1.3d further exhaust gas recirculation pipe
1.4 particle filter_I
1.4a particle filter_II
1.4' main particle filter
1.4x particle filter_I, coated
1.4x' main particle filter, coated
1.4ax particle filter_II, coated
1.4ax* particle filter, coated, additional or alternative
1.6 additional exhaust gas catalytic converter, 3-way or oxidation catalytic converter
1.6' main exhaust gas catalytic converter, 3-way or oxidation catalytic converter
1.6* exhaust gas catalytic converter, 3-way or oxidation catalytic converter, alternative
1.7 cooler_I
1.7* further cooler
1.7a cooler_II
1.7b further cooler
1.7c further cooler
1.7d further cooler
1.8 choke valve
1.8* choke valve alternative before 1.7
1.8a choke valve
1.8a* choke valve
1.8a/b choke valve
1.8b choke valve
1.8c choke valve
1.8d choke valve
1.9 valve
2 gasoline engine
2.1 exhaust manifold
2.2 inlet manifold
2.3 cylinder outlet
2.4 displacement
3 exhaust gas turbine, turbine
3a turbine
3b turbine
4 charge air compressor
4a compressor
4b compressor
5 charge air cooler
5.1 charge-air cooler
5.2 fresh air cooler
6 charge-air choke valve
7 fresh air
8 exhaust gas
9 control unit
9.1 control line
13 distribution pipe
A1 alternative
A2 alternative
Vf total volume
Vk compression volume
Vm volume
Vv compression ratio

What is claimed:

1. An exhaust gas recirculation system, comprising:
an exhaust pipe,
an inlet pipe,
a main exhaust gas catalytic converter located in the exhaust pipe,
a turbine located in the exhaust pipe,
a compressor located in the inlet pipe,
at least one exhaust gas recirculation pipe_II, which branches at the exhaust pipe and opens into the inlet pipe, and
at least one particle filter_II located in the exhaust gas recirculation pipe_II, wherein the exhaust gas recirculation pipe_II branches at least one of upstream and downstream of the main exhaust gas catalytic converter,
  wherein, when the exhaust gas recirculation pipe_II branches upstream of the exhaust gas catalytic converter, the particle filter_II has a 3/Ox coating, oxidizing CO to $CO_2$ and HC to $H_2O$ and reducing NOx to $N_2$ and $O_2$, and
  wherein, at least one cooler_II is provided inside the exhaust gas recirculation pipe_II downstream of the particle filter, and
  wherein the exhaust gas recirculation pipe_II branches at the exhaust pipe upstream of the turbine and opens in the inlet pipe upstream of the compressor.

2. An exhaust gas recirculation system, comprising:
an exhaust pipe,
an inlet pipe,
a main exhaust gas catalytic converter located in the exhaust pipe,
a turbine located in the exhaust pipe,
a compressor located in the inlet pipe,
at least one exhaust gas recirculation pipe_II, which branches at the exhaust pipe and opens into the inlet pipe, and
at least one particle filter_II located in the exhaust gas recirculation pipe_II,
  wherein the exhaust gas recirculation pipe_II branches at least one of upstream and downstream of the main exhaust gas catalytic converter,
  wherein, when the exhaust gas recirculation pipe_II branches upstream of the exhaust gas catalytic converter, the particle filter_II has a 3/Ox coating, oxidizing CO to $CO_2$ and HC to $H_2O$ and reducing NOx to $N_2$ and $O_2$, and
  wherein, at least one cooler_II is provided inside the exhaust gas recirculation pipe_II downstream of the particle filter, and
  wherein the exhaust gas recirculation pipe_II branches at the exhaust pipe downstream of the turbine and opens in the inlet pipe upstream of the compressor.

3. The exhaust gas recirculation system according to claim 2, wherein the particle filter_II, which is located downstream of the exhaust gas catalytic converter in the exhaust gas recirculation pipe_II, has the 3/Ox-coating, oxidizing CO to $CO_2$ and HC to $H_2O$ and reducing NOx to $N_2$ and $O_2$> or is free of the 3/Ox-coating.

4. An exhaust gas recirculation system, comprising:
an exhaust pipe,
a turbine,
an inlet pipe,
a compressor,
at least one exhaust gas recirculation pipe_I, which branches at the exhaust pipe upstream of the turbine and opens in the inlet pipe downstream of the compressor, and
at least one particle filter_I, which is located in at least one of the exhaust gas recirculation pipe_I and in the exhaust pipe upstream of the exhaust gas recirculation pipe_I,
  wherein the particle filter_I has a 3/Ox-coating oxidizing CO to $CO_2$ and HC to $H_2O$ and reducing NOx to $N_2$ and $O_2$,
  wherein the at least one particle filter_I is positioned upstream from at least one cooler_I provided inside the exhaust gas recirculation pipe_I,
  wherein at least one further exhaust gas recirculation pipe is provided, which branches at the exhaust gas recirculation pipe and opens into the inlet pipe,
  wherein, in the at least one further exhaust gas recirculation pipe, at least one further cooler is provided, and
  wherein the at least one further exhaust gas recirculation pipe opens in the inlet pipe upstream of the compressor.

5. The exhaust gas recirculation system according to claim 4, wherein provided in the exhaust pipe is a turbine and in the inlet pipe is a compressor, wherein the exhaust gas recirculation pipe_I branches at the exhaust pipe upstream of the turbine and opens in the inlet pipe downstream of the compressor.

6. The exhaust gas recirculation system according to claim 4, wherein the particle filter_I which is located in the exhaust gas recirculation pipe_I, is free of the 3/Ox-coating, and located upstream of the at least one particle filter_I is an additional exhaust gas catalytic converter inside the exhaust gas recirculation pipe_I.

7. The exhaust gas recirculation system according to claim 4,
  wherein a charge-air cooler is present in the inlet pipe, and
  wherein at least one of the cooler_I inside the exhaust gas recirculation pipe_I and the charge-air cooler is configured as at least one of an exhaust-gas engine cooling water cooler and as an exhaust gas low-temperature cooling water cooler, and is at least thermally separated from the particle filter.

8. The exhaust gas recirculation system according to claim 7,
  at least one of
    wherein a further cooler is provided inside the respective further exhaust gas recirculation pipe, and
    wherein a further cooler is located in the distribution pipe upstream of the respective further exhaust gas recirculation pipe.

9. The exhaust gas recirculation system according to claim 7,
  wherein the exhaust gas recirculation pipe_I and the further exhaust gas recirculation pipe are coupled by an adjustable valve, and
  wherein downstream of the adjustable valve a cooler is provided and/or downstream of the cooler a choke valve is provided.

10. The exhaust gas recirculation system according to claim 7,
  wherein in the respective further exhaust gas recirculation pipe a choke valve is provided, and
  wherein the choke valve is optionally located downstream of the at least one further cooler.

11. The exhaust gas recirculation system according to claim 4, wherein the further exhaust gas recirculation pipe branches downstream of the first particle filter of the exhaust gas recirculation pipe_I.

12. The exhaust gas recirculation system according to claim 4,
  wherein the cooler_I has, on the outlet side, an exhaust gas reference temperature Ta,
    wherein the exhaust gas reference temperature Ta is above a dew point of substances contained in the exhaust gas.

13. The exhaust gas recirculation system according to claim 4, wherein arranged in the inlet pipe are two compressors, wherein the at least one further exhaust gas recirculation pipe opens between the two compressors.

14. The exhaust gas recirculation system according to claim 4, wherein arranged in the inlet pipe are two compressors and at least two further exhaust gas recirculation pipes, which are connected in parallel by way of a common distribution pipe, branching at the exhaust gas recirculation pipe_I, wherein at least one further exhaust gas recirculation pipe opens at least one of upstream of at least one of the compressors, and downstream of at least one of the compressors.

15. The exhaust gas recirculation system according to claim 14, wherein as a supplement to the charge-air cooler, a fresh-air cooler is located in the inlet pipe, wherein the fresh-air cooler is located upstream of the opening of the exhaust gas recirculation pipe.

16. The exhaust gas recirculation system according to claim 4,
wherein a charge-air cooler and a charge-air choke valve are provided in the inlet pipe, wherein the opening of the exhaust gas recirculation pipe_I is located at least one of
i) at downstream of a position for the charge-air cooler,
ii) at downstream of a position for the charge-air choke valve,
iii) at upstream of a position for the charge-air cooler, and at downstream of a position for the charge-air choke valve.

17. The exhaust gas recirculation system according to claim 16, wherein the fresh-air cooler exhibits on the outlet side a fresh air reference temperature Tf with 150° C.>=Tf>=90° C. and the charge-air cooler exhibits on the outlet side a charge-air reference temperature Tu, with 30° C.<=Tu<=40° C.

18. The exhaust gas recirculation system according to claim 4, wherein a charge-air cooler is provided in the inlet pipe, wherein the opening of at least one further exhaust gas recirculation pipe is located upstream of a position for the charge-air cooler.

19. The exhaust gas recirculation system according to claim 4,
wherein a choke valve is provided in at least one of
i) the exhaust gas recirculation pipe_I, and
ii) in the exhaust gas recirculation pipe_II, by which, depending on the operating point, an exhaust gas mass flow is adjustable inside the exhaust gas recirculation pipe, and
wherein the choke valve is located downstream of at least one of the particle filters, or downstream of the cooler and upstream of the cooler.

20. The exhaust gas recirculation system according to claim 4,
wherein the exhaust pipe has two parallel exhaust pipe sections connected to an adjustable valve for switching between the two parallel pipe sections, and
wherein the exhaust gas catalytic converter is located in the exhaust pipe section, and in the parallel exhaust pipe section the particle filter is located, as well as the branch for the exhaust gas recirculation pipe_I.

21. The exhaust gas recirculation system according to claim 4, wherein downstream of the main exhaust gas catalytic converter, a main particle filter is provided, which is free of a catalytically effective coating for the conversion of CO, HC and/or NOx.

22. The exhaust gas recirculation system according to claim 4, wherein the exhaust gas recirculation pipe_I is allocated to one single cylinder outlet of a gasoline engine.

23. The exhaust gas recirculation system according to claim 4, wherein the turbine is configured as a VTG turbine.

24. An assembly, comprising:
a gasoline engine or exhaust gas system for a gasoline engine connected to an exhaust gas recirculation system comprising:
an exhaust pipe attached to an exhaust manifold of the gasoline engine,
a turbine,
an inlet pipe connected to an inlet manifold of the gasoline engine,
a compressor,
at least one exhaust gas recirculation pipe_I, which branches at the exhaust pipe upstream of the turbine and opens in the inlet pipe downstream of the compressor, and
at least one particle filter_I, which is located in the exhaust gas recirculation pipe_I or in the exhaust pipe upstream of the exhaust gas recirculation pipe_I,
wherein the particle filter_I has a 3/Ox-coating oxidizing CO to $CO_2$ and HC to $H_2O$ and reducing NOx to $N_2$ and $O_2$,
wherein the at least one particle filter_I is positioned upstream from at least one cooler_I provided inside the exhaust gas recirculation pipe_I,
wherein at least one further exhaust gas recirculation pipe is provided, which branches at the exhaust gas recirculation pipe and opens into the inlet pipe,
wherein, in the at least one further exhaust gas recirculation pipe, at least one further cooler is provided, and
wherein the at least one further exhaust gas recirculation pipe opens in the inlet pipe upstream of the compressor.

25. The gasoline engine according to claim 24, wherein the gasoline engine has a displacement exhibiting a volume Vh and with a compression volume Vk, wherein a compression ratio Vv=(Vh+Vk)/Vk is applied, with 15:1<=Vv<=10:1.

26. The gasoline engine according to claim 24, wherein the particle filter exhibits a total volume Vf, wherein for the total volume Vf the following applies: 0.1 Vh<=Vf<=1 Vh or 0.1 Vh<=Vf<=0.5 Vh or that a plurality of particle filters are provided, which together have the total volume Vf.

27. An exhaust gas recirculation system, comprising:
an exhaust pipe,
an inlet pipe,
a main exhaust gas catalytic converter located in the exhaust pipe,
a turbine located in the exhaust pipe,
a compressor located in the inlet pipe,
at least one exhaust gas recirculation pipe_II, which branches at the exhaust pipe and opens into the inlet pipe, and
at least one particle filter_II located in the exhaust gas recirculation pipe_II,
wherein the exhaust gas recirculation pipe_II branches at least one of upstream and downstream of the main exhaust gas catalytic converter,
wherein, when the exhaust gas recirculation pipe_II branches upstream of the exhaust gas catalytic converter, the particle filter_II has a 3/Ox coating, oxidizing CO to $CO_2$ and HC to $H_2O$ and reducing NOx to $N_2$ and $O_2$, and
wherein, at least one cooler_II is provided inside the exhaust gas recirculation pipe_II downstream of the particle filter, and wherein the exhaust gas recirculation pipe_II branches at the exhaust pipe downstream of the turbine and opens in the inlet pipe upstream of the compressor, and wherein a charge-air cooler is present in the inlet pipe, wherein at least one of the cooler_I inside the exhaust gas recirculation pipe_I and the charge-air cooler is configured as an exhaust gas engine cooling water cooler or as an exhaust gas low-temperature cooling water cooler, and is at least thermally separated from the particle filter.

28. A method for the operation of a gasoline engine connected to an exhaust gas recirculation system comprising:

an exhaust pipe attached to an exhaust manifold of the gasoline engine,
a turbine,
an inlet pipe connected to an inlet manifold of the gasoline engine,
a compressor,
at least one exhaust gas recirculation pipe_I, which branches at the exhaust pipe upstream of the turbine and opens in the inlet pipe downstream of the compressor, and
at least one particle filter_I, which is located in the exhaust gas recirculation pipe_I or in the exhaust pipe upstream of the exhaust gas recirculation pipe_I,
wherein the particle filter_I has a 3/Ox-coating oxidizing CO to $CO_2$ and HC to $H_2O$ and reducing NOx to $N_2$ and $O_2$,
wherein the at least one particle filter_I is positioned upstream from at least one cooler_I provided inside the exhaust gas recirculation pipe_I,
wherein at least one further exhaust gas recirculation pipe is provided, which branches at the exhaust gas recirculation pipe and opens into the inlet pipe, and
wherein, in the at least one further exhaust gas recirculation pipe, at least one further cooler is provided, and
wherein the at least one further exhaust gas recirculation pipe opens in the inlet pipe upstream of the compressor, the method comprising the steps of:
a) adjusting at least one of an EGR valve and early ignition angle adjustment via a control unit to achieve an exhaust gas recirculation rate during operation, at least for an HP-EGR and at least in a high-load range and at full load, to a value of up to 20%, up to 30%, up to 40% or up to 50%, and
b) at least one of
i) adjusting via the control unit a combustion center of gravity closer to a thermodynamically optimum value of 8° crank angle,
ii) reducing a fuel quantity to be delivered to the gasoline engine, and
iii) both i) adjusting via the control unit a combustion center of gravity closer to a thermodynamically optimum value of 8° crank angle and ii) reducing a fuel quantity to be delivered to the gasoline engine and a full-load enrichment is avoided.

29. The method according to claim 28, wherein at least one of the method steps a) and b) is repeated at least once.

* * * * *